US012714115B2

(12) United States Patent
De Waele

(10) Patent No.: US 12,714,115 B2
(45) Date of Patent: Aug. 25, 2026

(54) EDIBLE COATING COMPOSITION AND METHOD FOR MAKING AND PRODUCING THE SAME

(71) Applicant: DAWN FOOD PRODUCTS, INC., Jackson, MI (US)

(72) Inventor: Erwin De Waele, Essen (BE)

(73) Assignee: DAWN FOOD PRODUCTS, INC., Jackson, MI (US)

( * ) Notice: Subject to any disclaimer, the term of this patent is extended or adjusted under 35 U.S.C. 154(b) by 313 days.

(21) Appl. No.: 18/549,807

(22) PCT Filed: Mar. 16, 2022

(86) PCT No.: PCT/US2022/020512
§ 371 (c)(1),
(2) Date: Sep. 8, 2023

(87) PCT Pub. No.: WO2022/197777
PCT Pub. Date: Sep. 22, 2022

(65) Prior Publication Data

US 2024/0164390 A1 May 23, 2024

Related U.S. Application Data

(60) Provisional application No. 63/162,353, filed on Mar. 17, 2021.

(51) Int. Cl.

| | |
|---|---|
| ***A21D 13/28*** | (2017.01) |
| ***A21D 13/24*** | (2017.01) |
| ***A21D 13/60*** | (2017.01) |
| ***A21D 15/08*** | (2025.01) |
| ***A23G 3/34*** | (2006.01) |
| ***A23G 3/42*** | (2006.01) |

(52) U.S. Cl.
CPC ............. *A21D 13/28* (2017.01); *A21D 13/24* (2017.01); *A21D 13/60* (2017.01); *A21D 15/08* (2013.01); *A23G 3/343* (2013.01); *A23G 3/42* (2013.01)

(58) Field of Classification Search
None
See application file for complete search history.

(56) References Cited

U.S. PATENT DOCUMENTS

| | | | | |
|---|---|---|---|---|
| 1,510,679 | A | 10/1924 | Katzprowsky | |
| 5,631,034 | A | 5/1997 | Trumbetas et al. | |
| 2007/0202225 | A1* | 8/2007 | Chevalier | ............ A23L 29/231 426/302 |
| 2012/0015071 | A1 | 1/2012 | Ortega et al. | |
| 2013/0309370 | A1 | 11/2013 | Walter et al. | |
| 2017/0303575 | A1 | 10/2017 | Girard | |

FOREIGN PATENT DOCUMENTS

| | | | |
|---|---|---|---|
| DE | 202007009905 | U1 | 11/2008 |
| EP | 0922394 | | 2/2021 |
| WO | 2010012000 | A2 | 1/2010 |
| WO | 2019108839 | | 6/2019 |

OTHER PUBLICATIONS

International Search Report and Written Opinion for PCT/US2022/020512 dated Jun. 2, 2022.
Extended European search report for copending application No. 22772112.3, mailed Jan. 3, 2025.

* cited by examiner

*Primary Examiner* — Jyoti Chawla
(74) *Attorney, Agent, or Firm* — Barnes & Thornburg LLP

(57) ABSTRACT

The present disclosure relates generally to a shelf-stable and freeze-stable edible coating composition comprising a crystalline phase and a non-crystalline phase and methods of making and producing the same.

20 Claims, 5 Drawing Sheets

EDIBLE COATING COMPOSITION AND METHOD FOR MAKING AND PRODUCING THE SAME

CROSS REFERENCE TO RELATED APPLICATIONS

This nonprovisional application is a U.S. national stage application under 35 U.S.C. § 371(b) of International Application No. PCT/US2022/020512, filed Mar. 16, 2022, which claims the benefit and priority, under 35 U.S.C. § 119(e) and any other applicable laws or statutes, to the U.S. Provisional Application Ser. No. 63/162,353, filed on Mar. 17, 2021, the entire disclosures of both of which are hereby expressly incorporated herein by reference in their entireties.

TECHNICAL FIELD

The present disclosure relates generally to a shelf-stable and freeze-stable edible coating composition comprising a crystalline phase and a non-crystalline phase and methods of making and producing the same.

BACKGROUND

Pastries such as donuts or doughnuts, beignets or berliners, which are glazed or iced with a water-based coating have a considerable chance to turn sticky within 24 hours of ambient shelf life when placed in airtight packing or containers shortly after production, such as within about 20 minutes to about 45 minutes after a donut has been glazed and before the donut is packed. In most cases, this stickiness is a consequence of uncontrolled moisture migration from the pastry to the coating. One solution to prevent or reduce stickiness, known in the art, is to formulate a coated food product in which the pastry and the coating have activity of water or water activity ($A_w$) values that are similar or identical to each other.

For example, it is preferable to have an $A_w$ difference between the pastry and the coating that is no more than about 0.02 or 0.03. Further examples provide incorporation of a coarse grained crystalline phase to improve gloss and transparency of the coated food product. A method of producing such a coated food product is known in the art.

However, even with an $A_w$ difference between a water-based coating and pastry of 0.0, this solution provided in the prior art is only reliable to prevent the coating from becoming sticky in an airtight packaging for less than 2 days. Negative effects from moisture migration occur in this prior art formulation even faster when the water based coating is applied as a thin layer. Similarly, a coating or glazing with a coarse grained crystalline phase, such as that described in the prior art, attributes to a rough and gritty appearance and texture.

Because of the issues described herein, glazes and icings (e.g., individually and collectively called "coatings") are often applied to a foodstuff (e.g., such as a bakery good) close in time to when the coated food product or coated foodstuff is sold. Alternatively, the glazed foodstuff may be packed in non-airtight packaging to prevent liquefaction of the glaze. However, storage in unsealed or non-airtight packaging or containers can lead to drying out of the foodstuff and coating, formation of condensation on the glazed foodstuff upon defrosting, and/or to contamination of the glazed foodstuff. Over time, the glazes and icings tend to end up at the bottom of the container transporting the glazed foodstuff. This is particularly true if the glazed foodstuff is kept in an airtight container. Therefore, a need exists to develop an edible (e.g., water-based or fat-based) coating that remains stable in an airtight packaging.

SUMMARY

The disclosure herein provides stable edible compositions, also referred to as edible coating compositions, as well as, methods of making the same to generate aesthetically pleasing and palatably favorable coated food products with an extended shelf or storage life. An edible coating composition with improved stability comprises a crystalline phase. An edible coating composition with improved stability comprises a non-crystalline phase.

The crystalline phase comprises a low solubility sugar with a crystal morphology. The non-crystalline phase comprises a pectin in a non-gelled state. The edible coating composition further comprises free Ca2+ of less than about 5 ppm.

The low solubility sugar comprises a monosaccharide, disaccharide, or a polyol with lower solubility than sucrose. The edible coating composition of the low solubility sugar comprises crystals. In some embodiments, the low solubility sugar is isomaltulose.

The pectin may have a degree of amidation ranging from about 0% to about 14%. In some embodiments, the pectin has a degree of methoxylation of less than 25%. In other embodiments, the pectin has a degree of methoxylation of less than 50%. In further embodiments, the pectin has a degree of methoxylation that ranges from about 4% to about 10%.

The non-crystalline phase further comprises sucrose, a second sugar having a lower solubility than sucrose, glycerin, and water. In some embodiments, the second sugar is isomaltulose, maltose, or lactose. In exemplary embodiments, the second sugar is isolmaltulose.

The non-crystalline phase comprises a gelling agent in a non-gelled state. In some embodiments, the edible coating composition has a pH at or greater than about 3.0.

The edible coating composition is capable of remaining stable in an airtight container for at least 48 hours at ambient conditions. In some embodiments, the edible coating composition further comprises a sequestering agent. The sequestering agent captures free or ionized Ca2+.

The edible coating composition comprises the crystalline phase and the non-crystalline phase present in a ratio of about 2:1 to 1:2, and any specific ratio comprised therein. In some embodiments, the crystalline phase and non-crystalline phase are present in a ratio of about 1:1.

The edible coating composition has a dry matter content that is greater than 55%. In some embodiments, the dry matter content ranges from about 48% to about 85%. In other embodiments, the edible coating composition has a dry matter content that is at or greater than 65%.

The edible coating composition has a pH ranging from about 3.6 to about 4.5. In some embodiments, the free or ionized Ca2+ is below 5 ppm.

A method of making a coated foodstuff product comprises coating a foodstuff with an edible coating composition. The edible coating composition comprises a crystalline phase and a non-crystalline phase. The crystalline phase comprises a low solubility sugar with a crystal morphology. The non-crystalline phase comprises a pectin in a non-gelled state.

The method further comprises applying the edible coating composition onto the foodstuff, and producing a coated foodstuff product. The edible coating composition may be applied as an even layer having a uniform or consistent thickness on, atop, or surrounding the foodstuff.

In some embodiments, the step of applying the edible coating composition to a foodstuff comprises a glaze curtain. The method also includes an edible coating composition applied directly onto the foodstuff. In some embodiments, there is no intervening material between the foodstuff and the edible coating composition. In some embodiments, the edible coating composition is applied as a layer having a uniformly consistent thickness on the foodstuff. In some embodiments, the thickness of the coating layer ranges from about 0.2 mm to about 5 mm.

In some embodiments, the foodstuff is a bakery food good or a fried food good. In exemplary embodiments, the foodstuff is a donut. The donut may be a yeast-raised donut. The donut may also be a cake donut.

In some embodiments, the edible coating has improved stability that prevents or reduces blooming. In some embodiments, the crystalline phase comprises sugar crystals or mineral crystals having an average diameter equal to or less than about 100 microns. In some embodiments, the sugar crystals or mineral crystals have an average diameter of about 100 microns. In some embodiments, the sugar crystals or mineral crystals of the crystalline phase have an average diameter equal to or less than about 50 microns. In some embodiments, the edible coating has an opacity that appears translucent or transparent.

In some embodiments, the foodstuff has a temperature ranging from about −30° C. to 200° C. The edible coating composition remains stable for at least 48 hours in an airtight container at ambient conditions. The opacity of the edible coating composition is controlled without the addition of a pigment or a coloring.

BRIEF DESCRIPTION OF THE DRAWINGS

The disclosure will be better understood, and features, aspects, and advantages other than those set forth above will become apparent when consideration is given to the following detailed description thereof. Such detailed description makes reference to the following drawings, wherein.

DETAILED DESCRIPTION

Figure 1:
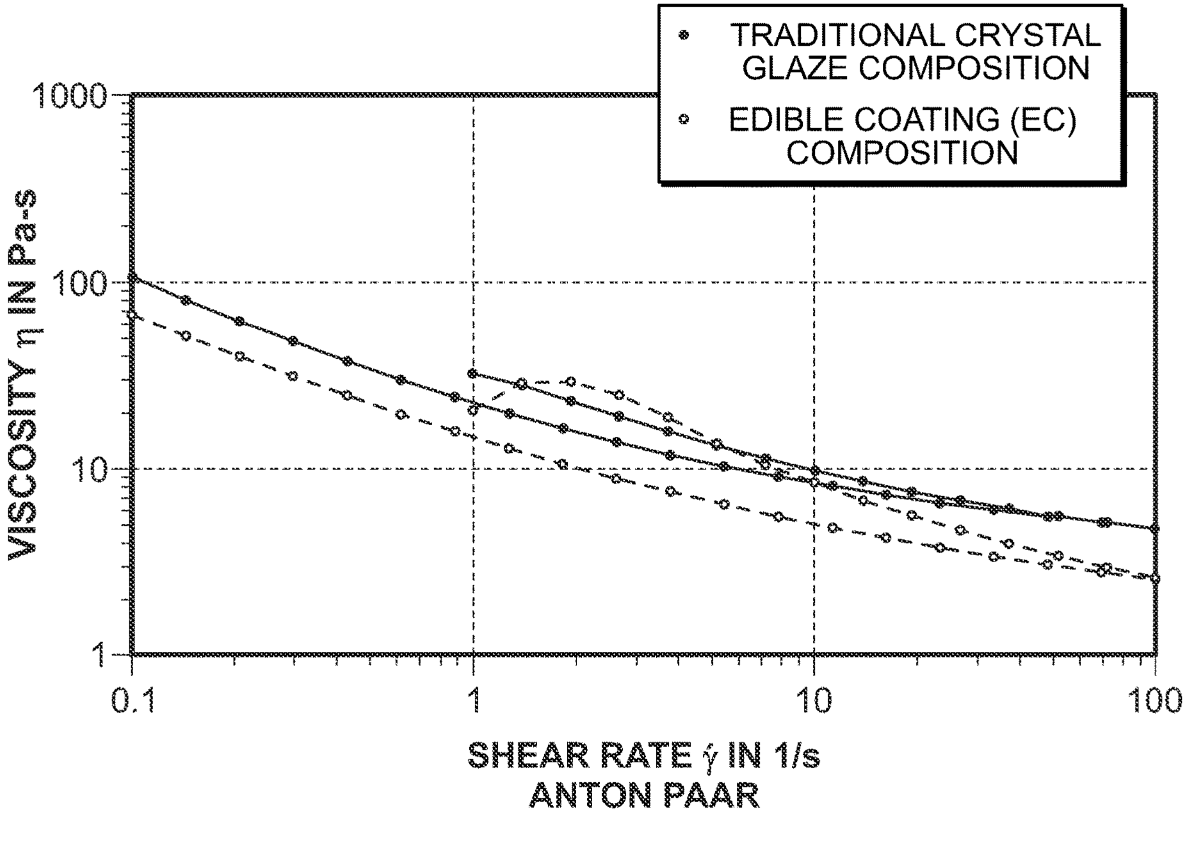
FIG. 1 is a graph showing the viscosity profile of an embodiment of an edible coating composition of the present disclosure compared to a traditional sucrose-based crystal glaze.

The present disclosure is directed to an edible coating composition. In some aspects, the edible coating composition is in contact with a foodstuff to produce a coated food product or a coated foodstuff. In some aspects, the edible coating composition is in contact with a top surface and/or an outer surface of the coated foodstuff.

The edible coating composition, when in contact with the foodstuff, is capable of maintaining stability of the coated food product in an airtight packaging for at least 24 hours. In some embodiments, the edible coating composition is produced in such a manner as to reduce the effects of moisture migration and resulting stickiness from developing on the coated food product for at least 24 hours.

In some embodiments, the foodstuff or food product may comprise baked goods, pastries, or confections (e.g., candies). Baked goods may include, but are not limited to, cakes, cupcakes, pies, cookies, breads and sweet breads, pastry shop products, bakery shop products or the like. Pastries may include, but are not limited to deep-fried pastries, such as beignets, fritters, elephant ears, funnel cakes, churros, and/or donuts. Donuts, referred to also as doughnuts, may be yeast raised donuts and/or cake donuts.

In some embodiments, the foodstuff includes any foodstuff or food product to which the edible coating composition may be applied or come into contact. The foodstuff may be in any form and may comprise any number of different edible components and/or compounds (e.g., chocolate, sprinkles, candy, etc.). In some embodiments, the foodstuff is not candy. In some embodiments, the foodstuff is not pie. In some embodiments, the foodstuff is not fruit. In some embodiments, the foodstuff is not meat.

The activity of water or water activity ($A_w$) of the foodstuff plays, in part, a significant role in moisture migration from the foodstuff to the edible coating composition. In some embodiments, the $A_w$ value of the foodstuff ranges from about 0.84 to about 0.94. In some embodiments, the supporting foodstuff has an $A_w$ greater than 0.85, greater than or equal to 0.88 (e.g., cake donuts), or greater than or equal to 0.92 (e.g., yeast raised donuts).

Reducing the difference in $A_w$ between the edible coating and the foodstuff or substrate, may also result in a reduced degradation of the coating, even when stored in an airtight container. The reduced degradation of the coating therefore results from the nullification of the $A_w$ gradient between the coating and the substrate. To observe this reduced degradation feature of the edible coating, the $A_w$ gradient between the coating and the foodstuff or substrate will range from about 0.0001 to about 0.15, including any specific or range of $A_w$ gradient comprised therein, such as from about 0.01 to about 0.10, from about 0.02 to about 008, or from about 0.03 to about 0.065.

In an illustrative aspect, an edible coating composition is provided. In some embodiments, the edible coating composition is a fondant-like product. In some embodiments, the edible coating composition is provided as a coating. The coating may be selected from one or more of a glaze, an icing, a fondant, a frosting, combinations thereof, or the like.

As used herein, the term “glaze” refers to an application of the edible coating composition to a whole substrate (e.g., a foodstuff) by a glazing curtain known to those of ordinary skill in the art or in the food or bakery industry. A glazing curtain generally refers to a manual or mechanical means of applying the edible coating to the whole top and sides surfaces of the foodstuff by sliding or rolling the foodstuff under the curtain. As used herein, the term “icing” refers to an application of the edible coating composition by dipping a foodstuff using manual or mechanical techniques known in the art or as food and bakery industry methods.

An icing coating may have a thickness that ranges from about 0.5 mm to about 5.0 mm, including any specific or range of thickness comprised therein. A glaze coating may have a thickness that ranges from about 0.2 mm to about 2.0 mm, including any specific or range of thickness comprised therein. In some embodiment, an icing is thicker than a glaze coating.

As provided herein, a foodstuff may be a wide range of temperatures (e.g., from frozen to freshly fried) during application of the edible coating composition as a glaze or an icing. While a glaze or icing may be applied to any foodstuff at any temperature, an exemplary icing is applied to a foodstuff (e.g., a donut) at ambient or cold temperatures. In addition, often icings require drying times that are more critical to regulate, whereas drying of glazes is less critical due to the fact that glazes are mostly applied on a hot (e.g., freshly fried) substrate.

The edible coating composition comprises a sugar or an organic compound derived from sugar or from other components from carbohydrate origin, such as a sugar alcohol or polyol. In some embodiments, the sugar may comprise a monosaccharide, a disaccharide, and/or a polysaccharide. In some embodiments, the sugar comprises a monosaccharide, such as glucose, fructose, and/or galactose. In some embodiments, the sugar comprises a disaccharide, for example sucrose, lactose, isomaltulose, trehalose, and/or maltose. In some embodiments, the sugar comprises a polysaccharide, for example, hydrolyzed poly or—oligo-saccharides. In some embodiments, the edible coating composition comprises a sugar alcohol or a polyol, the sugar alcohol or polyol may comprise mannitol, sorbitol, xylitol, lactitol, isomalt, maltitol, erythritol, and/or hydrogenated starch hydrolysates (HSH).

In an illustrative embodiment, the icing or the glaze of the edible coating composition comprises a crystalline phase and a non-crystalline phase. In an exemplary embodiment, the edible coating composition consists essentially of a crystalline phase and a non-crystalline phase. In some embodiments, the edible composition comprises a crystalline phase dispersed into a non-crystalline phase.

The formulation of and the ratio between the crystalline phase and the non-crystalline phase in the edible coating composition can, in part, determine the performance (e.g., speed of drying, stability, reduction of moisture migration effects, etc.) of the edible composition after it contacts the foodstuff. In some embodiments, the ratio of the crystalline phase to the non-crystalline phase is about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, or about 1:10. In some embodiments, the ratio of the crystalline phase and the non-crystalline phases in the edible coating composition is about 3:2 or about 2:3.

In some embodiments, the ratio of crystalline phase to non-crystalline phase in the edible coating composition is about 2:1 to 1:2. In some embodiments, the ratio of crystalline phase to non-crystalline phase in the edible coating composition is about 2:1. In some embodiments, the ratio of crystalline phase to non-crystalline phase in the edible coating composition is about 1:2. In some embodiments, the ratio of crystalline phase to non-crystalline phase in the edible coating composition is about 1:1. As will be described in more detail, in one illustrative aspect, when moisture is migrating to the edible coating composition, some of the crystals in the crystalline phase may dissolve and become part of the non-crystalline phase. Accordingly, with the introduction of moisture, the non-crystalline phase percentage (%) increases and the crystalline phase percentage (%) decreases for the overall edible coating composition. The components of the edible coating composition as described herein have a mitigating impact on the moisture’s effect on the edible coating composition. Without being limited by theory, it is thought that the ratio of crystalline phase to non-crystalline phase, the low solubility of the components in the crystalline phase, and/or the reduced difference in water activity of the edible coating composition compared to the foodstuff, all contribute to the reduced ability of moisture to dissolve the crystalline phase to form more of the non-crystalline phase.

The presence of the crystalline phase in the edible coating composition advantageously helps the edible coating composition to dry within or less than 1 hour after application on the foodstuff. For example, the edible coating composition may dry subsequent to application on a foodstuff in less than about 60 minutes, less than about 55 minutes, less than about 50 minutes, less than about 45 minutes, less than about 40 minutes, less than about 35 minutes, or less than about 30 minutes. In some embodiments, the edible coating composition may dry after the application to a foodstuff between about 1 minute to about 60 minutes, including any specific or range of time comprised therein, including about 5 minutes to about 60 minutes, about 10 minutes to about 60 minutes, about 15 minutes to about 50 minutes, about 20 minutes to about 60 minutes, about 25 minutes to about 60 minutes, about 30 minutes to about 60 minutes, about 35 minutes to about 60 minutes, about 40 minutes to about 60 minutes, or about 45 minutes to about 60 minutes. In some embodiments, the edible coating composition dries in about 5 minutes, about 10 minutes, about 15 minutes, about 20 minutes, about 25 minutes, about 30 minutes, about 35 minutes, about 40 minutes, about 45 minutes, about 50 minutes, about 55 minutes or about 60 minutes after application on a foodstuff.

Additionally, the formulation and ratio of the crystalline phase to the non-crystalline phase of the edible coating composition can determine, at least in part, the degree of gloss and/or transparency of the edible coating composition once applied to the foodstuff. Further, the formulation and ratio of the crystalline phase to the non-crystalline phase of the edible coating composition also affects the duration of time that the coated foodstuff is free of tackiness or stickiness during airtight storage or shelf-life.

In some embodiments, the crystalline phase of the edible coating composition comprises a sugar or an organic compound derived from sugar or other components from carbohydrate origin, such as a sugar alcohol or polyol. In some embodiments, the sugar may comprise a monosaccharide, a disaccharide, and/or a polysaccharide. In some embodiments, the sugar comprises a monosaccharide, such as glucose, fructose, and/or galactose. In some embodiments, the sugar comprises a disaccharide, for example sucrose, lactose, isomaltulose, trehalose, and/or maltose. In embodiments of the edible coating composition where the crystalline phase comprises a sugar alcohol or a polyol, the sugar alcohol or polyol may comprise mannitol, sorbitol, xylitol, lactitol, isomalt, maltitol, erythritol, and/or hydrogenated starch hydrolysates (HSH).

In some embodiments, the crystalline phase of the edible coating composition does not comprise sugars or other components from carbohydrate origin that do not comprise a crystalline structure. For example, in some embodiments, the crystalline phase does not comprise a polysaccharide. In other embodiments, the crystalline phase does not an oligosaccharide.

In some embodiments, the crystalline phase of the edible coating composition may comprise a sugar that has a lower solubility than sucrose at the same temperature. In some embodiments, the crystalline phase of the edible coating composition comprises isomaltulose. In some other embodiments, the crystalline phase of the edible coating composition consists essentially of isomaltulose. Some edible coating composition embodiments comprise a combination of isomaltulose and a gelling agent. In some embodiments, the gelling agent is in a non-gelled state.

In some embodiments, isomaltulose may be substituted for another component including, but not limited to, a monosaccharide, a disaccharide, polyols, and/or other carbohydrates. Isomaltulose may be substituted in the edible coating composition with any edible component that comprises a solubility below the solubility of sucrose at any specified temperature (e.g., "low solubility" component or sugar) that also comprises a crystalline morphology.

In an illustrative aspect, the crystalline phase of the edible coating composition comprises one or more or two or more, three or more (e.g., a plurality) of crystals of a sugar and/or crystals of a sugar alcohol. The crystalline phase may be formed from a saturated solution. To form a saturated solution, sugar and/or sugar alcohol crystals are added to a solution until a saturation level is achieved. Crystals are subsequently added to a solution which is already saturated with the respective sugar and/or sugar alcohol at any specific temperature at which saturation occurs for that sugar known to form a saturated solution.

In some embodiments, the crystalline phase of the edible coating composition comprises crystals from mineral origin. Exemplary mineral crystals include, but are not limited to carbonates, phosphates, or sulphates. Crystalline mineral components having low solubility may be substituted for some of the carbohydrates or sugars, which constitute the crystalline phase. By substituting crystalline minerals for crystalline carbohydrates or sugars, the edible coating composition advantageously reduces the amounts of sugar and/or calorie levels, and so provides a healthier alternative, without negatively affecting the improved functionalities of the edible composition, such as shelf-life, stability (e.g., freezer stability), mouthfeel, palatability, oral enjoyment, etc.

An edible coating composition comprising a crystalline phase incorporated or embedded within its own saturated solution may be used to form fondant-like products. The crystalline phase of fondant-like products also combines sweetness with a semi-solid structure and creamy "melt in mouth" eating properties. These improved taste and mouthfeel qualities of the present edible coating composition are attributed to the compositions comprised by the crystalline phase of the present edible coating composition.

In some embodiments, the crystals have an average diameter of no larger than about 100 microns. In some embodiments, the crystalline phase comprises crystals having an average diameter less than about 90 microns, 80 microns, 70 microns, 60 microns, 50 microns, 40 microns, 30 microns, 20 microns, or 10 microns. In some embodiments, the crystals have an average diameter ranging from about 5 microns to about 55 microns, about 10 microns to about 50 microns, about 15 microns to about 45 microns, about 20 microns to about 40 microns, or about 25 microns to about 35 microns. In some embodiments, the average diameter of the crystals is about 5 microns, about 10 microns, about 15 microns, about 20 microns, about 25 microns, about 30 microns, about 35 microns, about 40 microns, about 45 microns, about 50 microns, or about 55 microns. In some embodiments, the crystalline phase comprises crystals having an average diameter of less than about 55 microns resulting in an opaque edible coating composition. In some embodiments, the crystalline phase includes crystals having an average diameter of less than 105 microns, 100 microns, 95 microns, 90 microns, 85 microns, 80 microns, 75 microns, 70 microns, 65 microns, or 60 microns. In some embodiments, the crystals have an average diameter ranging from about 55 microns to about 105 microns, 60 microns to about 100 microns, about 65 microns to about 95 microns, about 70 microns to about 90 microns, or about 75 microns to about 85 microns. In some embodiments, the crystals have an average diameter of about 60 microns, about 65 microns, about 70 microns, about 75 microns, about 80 microns, about 85 microns, about 90 microns, about 95 microns, about 100 microns, or about 105 microns.

Opaqueness or opacity of the edible coating composition is decreased as the size of the crystals is increased. Consequently, the larger the size of the crystals, for example diameters of about 40 microns to about 125 microns, including any specific or range of sizes comprised therein, the more transparent the edible coating composition. Transparency may be a desired aspect for glazed donuts.

To limit the opacity and improve the transparency of the edible coating composition, the average diameter of the crystals should be no smaller than about 75 microns. In some embodiments of the present edible coating composition, the crystalline phase includes sugar crystals having an average diameter of or more than about 75 microns to decrease the opacity and increase the transparency and translucence of the edible coating composition.

More specifically, an icing of the present disclosure may comprise about 90% by weight of sugar in the crystalline phase. The crystals within the crystalline sugar phase may have an average diameter size of about 50 micron (0.05 mm) or less, including any specific or range of sizes comprised therein. For example, the average diameter of the crystals may be from about 5 microns to about 55 microns, about 10 microns to 50 microns, about 15 microns to 50 microns, about 20 microns to about 50 microns, about 25 microns to about 50 microns, about 30 microns to 55 microns, about 30 microns to about 45 microns, about 40 microns to about 50 microns, about 45 microns to about 55 microns, about 25 microns about 35 microns, about 20 microns to about 40 microns, or about 15 microns to 45 microns. In some embodiments, the average diameter of the crystals may about 5 microns, about 10 microns, about 15 microns, about 20 microns, about 25 microns, about 30 microns, about 35 microns, about 40 microns, about 45 microns, about 50 microns, or about 55 microns. The smaller crystal size of the icing provides increased opacity, which is a desired feature of an icing coating composition.

Conversely, a glaze or glazing of the present disclosure may comprise about 90% by weight of a sugar in the crystalline phase. The crystals in the crystalline sugar phase may have an average diameter size of about 75 microns or more In some embodiments, the crystals may have an average diameter of about 50 microns to 105 microns, about 55 microns to about 105 microns, about 55 microns to about 100 microns, about 60 microns to about 100 microns, about 65 microns to about 105 microns, about 65 microns to about 100 microns, about 70 microns to about 100 microns, about 75 microns to about 105 microns, about 75 microns to about 100 microns, about 55 microns to about 75 microns, about 80 microns to about 100 microns, about 85 microns to about 100 microns, about 90 microns to about 100 microns, about 60 microns to about 80 microns, or about 85 microns to about 105 microns, including any size or range of sizes comprised therein. In some embodiments, the average diameter may be about 55 microns, about 60 microns, about 65 microns, about 70 microns, about 75 microns, about 80 microns, about 85 microns, about 90 microns, about 95 microns, about 100 microns, or about 105 microns. This larger size crystal will provide decreased opacity and a more translucent or transparent glaze, a desired feature of a glazing.

In some embodiments, the opacity of the edible coating composition (i.e., ranging from high opacity being opaque to low opacity being transparent) can be affected based on the sugar crystal size of the crystalline phase, the ratio between the crystalline phase and the non-crystalline phase, and/or the glaze or icing thickness. Consequently, and as described herein, the opacity of the edible coating composition may also be controlled to improve the transparency of the edible coating composition by manipulating the sugar crystal size of the crystalline phase, the ratio between the crystalline phase and the non-crystalline phase, and the glaze or icing thickness.

In some embodiments, the thickness of the glaze or icing of the present edible coating composition, when applied to a foodstuff, does not exceed about 5 mm. In some embodiments, the edible coating composition may comprise a thickness ranging from about 0.2 mm to about 3 mm or about 0.2 mm to about 2 mm, including any specific or range of thicknesses comprised therein. In an illustrative embodiment, the thickness of the edible food coating may be about 0.5 mm.

Contrary to many present day coatings, such as glazings and icings, the edible coating composition of the present disclosure does not require any additional ingredients, compositions, and/or compounds to improve its opacity (e.g., increase opaqueness and decrease transparency). More specifically, in some embodiments of the present coating composition, no ingredient, composition, and/or compound is added to effect the opacity of the coating. For example, in some embodiment, the opacity of the edible coating composition can be controlled without the addition of a pigment, a thickener, a flavoring, and/or a coloring to the edible coating composition.

In other embodiments of the present edible coating composition, no ingredient, composition, and/or compound that has been "blacklisted" or deemed in any country to be undesirable, dangerous, or hazardous to humans is added to effect the opacity of the coating. In some embodiments, titanium oxide ($TiO_2$) is not present in the edible coating composition. In other embodiments, the edible coating compositions excludes any compound or composition that comprises titanium oxide ($TiO_2$) or any compound or composition that may form titanium oxide ($TiO_2$), such as via a chemical or biological reaction.

As previously described, in addition to the crystalline phase, the edible coating composition may also comprise a non-crystalline phase. In exemplary embodiments, the edible coating composition does comprise a non-crystalline phase. In one embodiment, the non-crystalline phase may comprise one or more of a sugar, a pectin, a water, a hydrocolloid (e.g., a gelling and/or a viscosifying agent), a calcium sequestering agent, or a combination thereof. For example, a polysaccharide may be added as a viscosifying agent.

Typically, the non-crystalline phase of the edible coating composition is a liquid phase or a solution. A liquid non-crystalline phase of the edible coating composition may comprise solutes dissolved into a solvent. Illustrative solvents of the non-crystalline phase may comprise any solvents known to be used in edible compositions. In some embodiments, the solvent is aqueous. In some embodiments, the solvent is water. In some embodiments, the solvent is soft water.

In some embodiments, the non-crystalline phase of the edible coating composition comprises about 15% to about 45% by weight, including any specific or range of water comprised therein. In some embodiments, the non-crystalline phase of the edible coating composition comprises about 15%, about 15.5%, about 16%, about 16.5%, about 17%, about 17.5%, about 18%, about 18.5%, about 19%, about 19.5%, about 20%, about 20.5%, about 21%, about 21.5%, about 22%, about 22.5%, about 23%, about 23.5%, about 24%, about 24.5%, about 25%, about 25.5%, about 26%, about 26.5%, about 27%, about 27.5%, about 28%, about 28.5%, about 29%, about 29.5%, about 30%, about 30.5%, about 31%, about 31.5%, about 32%, about 32.5%, about 33%, about 33.5%, about 34%, about 34.5%, about 35%, about 35.5%, about 36%, about 36.5%, about 37%, about 37.5%, about 38%, about 38.5%, about 39%, about 39.5%, about 40%, about 40.5%, about 41%, about 41.5%, about 42%, about 42.5%, about 43%, about 43.5%, about 44%, about 44.5%, about 45% by weight. Percent (%) by weight, as described herein, refers to the amount or concentration of a component or components in the edible coating composition as a whole, including both the non-crystalline phase and the crystalline phase.

In some embodiments, the non-crystalline phase of the edible coating composition comprises about 15% to about 45% by weight of water, including any specific or range of water comprised therein. In some embodiments, the non-crystalline phase of the edible coating composition comprises about 15%, about 15.5%, about 16%, about 16.5%, about 17%, about 17.5%, about 18%, about 18.5%, about 19%, about 19.5%, about 20%, about 20.5%, about 21%, about 21.5%, about 22%, about 22.5%, about 23%, about 23.5%, about 24%, about 24.5%, about 25%, about 25.5%, about 26%, about 26.5%, about 27%, about 27.5%, about 28%, about 28.5%, about 29%, about 29.5%, about 30%, about 30.5%, about 31%, about 31.5%, about 32%, about 32.5%, about 33%, about 33.5%, about 34%, about 34.5%, about 35%, about 35.5%, about 36%, about 36.5%, about 37%, about 37.5%, about 38%, about 38.5%, about 39%, about 39.5%, about 40%, about 40.5%, about 41%, about 41.5%, about 42%, about 42.5%, about 43%, about 43.5%, about 44%, about 44.5%, about 45% by weight of water.

In some embodiments, the activity of water or water activity ($A_w$) of the edible coating composition may be adjusted based on the foodstuff. The water activity or $A_w$ is mainly determined by the non-crystalline phase of the edible coating composition. The $A_w$ value results from the type and concentration level of the solutes comprised in the non-crystalline phase of the edible coating composition. For example, a saturated sucrose solution will demonstrate an $A_w$ of about 0.85 at ambient temperatures. In addition to sucrose, other solutes can be incorporated into the non-crystalline phase to affect the $A_w$ of the edible coating composition.

For example, the $A_w$ values of most commercially available fondant-like food products will vary between 0.85 and 0.80. As a result of this $A_w$ range, when a traditional fondant-like product is applied to and/or coated on a foodstuff (e.g., a cake or yeast donut), the $A_w$ difference between the coating and the supporting foodstuff will vary from about 0.0001 to about 0.06 or about 0.05 to about 0.15, including any specific or range of $A_w$ comprised therein.

In some embodiments, the non-crystalline phase comprises one or more of a sugar and/or a sugar alcohol or polyol. In some embodiments, the sugar may comprise a monosaccharide, a disaccharide, and/or a polysaccharide. In some embodiments, the sugar comprises a monosaccharide, such as glucose, fructose, and/or galactose. In some embodiments, the sugar comprises a disaccharide, for example sucrose, lactose, isomaltulose, trehalose, and/or maltose. In some embodiments, the sugar comprises a polysaccharide, for example, celluloses, and starches, both in their native form and/or components resulting from any chemical, physical and/or biochemical modifications of starches and celluloses.

In some embodiments, the edible coating composition comprises a sugar alcohol or a polyol, the sugar alcohol or polyol may comprise mannitol, sorbitol, xylitol, lactitol, isomalt, maltitol, erythritol, and/or hydrogenated starch hydrolysates (HSH). In some embodiments, the non-crystalline phase comprises all components of the crystalline phase present as solutes at their saturation level. The non-crystalline phase includes a solvent including water, for example juice, milk, or distilled water. In some embodiments, none or 0% of the one or more sugars and/or sugar alcohols of the non-crystalline phase comprise crystals (e.g., no or 0% sugar crystals in the non-crystalline phase). In an illustrative aspect, the crystal morphology (or lack thereof), grain size, or fineness of a sugar or sugar alcohol or polyol is not limiting on the non-crystalline phase because the sugar dissolves in the solvent such that these features of the sugar are irrelevant. In some embodiments, the non-crystalline phase comprises sucrose and a second sugar having a lower solubility than sucrose. In some embodiments, the non-crystalline phase further comprises glycerin.

For example, in some embodiments, the non-crystalline phase comprises a first sugar. In some embodiments, the non-crystalline phase comprises a first sugar that is soluble. In some embodiments, the first sugar comprises sucrose. In some embodiments, the non-crystalline phase comprises a first sugar that is soluble sucrose.

In some embodiments, the first sugar is present in the non-crystalline phase at an amount of about 12% to about 27% by weight, including any specific or range of weight comprised therein. In some embodiments, the first sugar is present in the non-crystalline phase at an amount of about 12%, about 13%, about 14%, about 15%, about 16%, about 17%, about 18%, about 19%, about 20%, about 21%, about 22%, about 23%, about 24%, about 25%, about 26%, or about 27% by weight.

In some embodiments, the non-crystalline phase further comprises a second sugar. The second sugar of the non-crystalline phase has a lower solubility than sucrose. In some embodiments of the non-crystalline phase, the second sugar comprises maltose, lactose, isomaltulose, or a combination thereof. In some embodiments, the second sugar comprises isomaltulose.

In some embodiments of the non-crystalline phase, the second sugar is isomaltulose, including any specific or range of weight comprised therein. In some embodiments of the non-crystalline phase, the second sugar is present in an amount between about 7% to about 13%. In some embodiments, the second sugar is present in the non-crystalline phase at an amount of about 7%, about 7.5%, about 8%, about 8.5%, about 9%, about 9.5%, about 10%, about 10.5%, about 11%, about 11.5%, about 12%, about 12.5%, or about 13% by weight.

In some embodiments, the sugar of the non-crystalline phase may include one or more oligosaccharides. The oligosaccharides may contain high levels (e.g., greater than 50%) of molecules with a Degree of Polymerization (DP) of between about 3 and about 8. In some embodiments, oligosaccharides may comprise from about 50% to about 100%, from about 50% to about 90%, from about 50% to about 80%, from about 50% to about 70%, from about 50% to about 100%, from about 60% to about 100%, from about 60% to about 90%, from about 60% to about 80%, from about 60% to about 70%, from about 70% to about 100%, from about 70% to about 90%, from about 70% to about 80%, from about 80% to about 100%, from about 80% to about 90%, from about 90% to about 95%, from about 95% to about 99.5%, from about 90% to about 98%, from about 90% to about 99%, and from about 90% to about 100% molecules with a Degree of Polymerization (DP) of between about 3 and about 8 (e.g., high levels). Without being limited by theory, including a high level of molecules with a DP of between about 3 to about 8 in the non-crystalline phase allows a reduction of moisture levels of the edible coating composition without excessively reducing water activity or increasing viscosity. In some embodiments, a reduction of moisture levels can also advantageously help to reduce drying times subsequent to application of the edible coating composition to the foodstuff.

In some embodiments, the oligosaccharides are characterized by low levels of mono- and disaccharides (i.e., DP of 1 and 2). Without being limited by theory, it is thought that mono- and disaccharides do not, only to a very limited extent, or will significantly contribute to a reduction of the water activity of the edible coating composition. In some embodiments, the one or more oligosaccharides are also characterized by low levels (e.g., less than 50%) of "higher oligosaccharides" (with a DP of 9 or higher). Without being limited by theory, it is thought that the higher oligosaccharides do not, only to a very limited extent, or will significantly contribute to an increase of the viscosity of the edible coating composition. In some embodiments, oligosaccharides may comprise from about 5% to about 49.5%, from about 10% to about 40%, from about 10% to about 30%, from about 10% to about 20%, from about 10% to about 49.5, from about 20% to about 49.5%, from about 20% to about 40%, from about 20% to about 30%, from about 20% to about 25%, from about, from about 30% to about 49.5%, from about 30% to about 40%, from about 30% to about 45%, from about 35% to about 49.5%, from about 40% to about 49.5%, from about 40% to about 45%, and from about 42.5% to about 49.5% molecules with a Degree of Polymerization (DP) of about 1 to about or a DP of 9 or higher (e.g., low levels).

In some embodiments, the dry matter in the non-crystalline phase may comprise one or more oligosaccharides containing molecules comprising high levels of DP between about 3 to about 8, low levels of DP of about 1 to about 2, and a low level of a DP of 9 or higher. In some embodiments, the non-crystalline phase comprises additional solutes. In some embodiments, the one or more oligosaccharides are present in the non-crystalline phase at an amount of about 7 to about 27% by weight of the complete coating, including any specific or range of weight comprised therein. In some embodiments, the oligosaccharides are present in the non-crystalline phase at an amount of about 12%, about 13%, about 14%, about 15%, about 16%, about 17%, about 18%, about 19%, about 20%, about 21%, about 22%, about 23%, about 24%, about 25%, about 26%, or about 27% by weight.

In some embodiments of the edible coating composition, the non-crystalline phase also comprises a gelling agent. The gelling agent may be in a gelled or a non-gelled state. While any gelling agent known in the food or bakery arts may be used, an exemplary gelling agent is a hydrocolloid. Examples of hydrocolloids, include but are not limited to, pectin, agar, gelatin xanthan gum, and carrageenan.

In some embodiments of the non-crystalline phase, the pectin is in a gelled state. In an exemplary embodiments of the non-crystalline phase, the pectin is in a non-gelled state or form. In an illustrative aspect, the non-gelled pectin forms a three-dimensional matrix upon gelling that is capable of holding, binding, and/or capturing the non-crystalline phase to improve stability and prevent wetting or running. In some embodiments, the non-crystalline phase comprises a low solubility sugar and a pectin in a non-gelled state.

In some embodiments, the pectin is present in the non-crystalline phase in an amount ranging from 0.20% to about 2.0% by weight. In some embodiments, the pectin is present in an amount of about 0.20%, about 0.25%, about 0.30%, about 0.35%, about 0.40%, about 0.45%, about 0.50%, about 0.55%, about 0.60%, about 0.65%, about 0.70%, about 0.75%, about 0.80%, about 0.85%, about 0.90%, about 0.95%, about 1.0%, about 1.05%, about 1.10%, about 1.15%, about 1.20%, about 1.25%, about 1.30%, about 1.35%, about 1.40%, about 1.45%, about 1.50%, about 1.55%, about 1.60%, about 1.65%, about 1.70%, about 1.75%, about 1.80%, about 1.85%, about 1.90%, about 1.95%, about 2.0%, about 2.05%, or about 2.10% by weight.

The pectin of the non-crystalline phase may be a low ester pectin. In some embodiments, the low ester pectin comprises less than about 25% of esterification, including any specific or range of esterification comprised therein. In some embodiments, the low ester pectin comprises less than about 20%, less than about 15%, less than about 10%, or less than or at about 5% of esterification, including any specific or range of esterification comprised therein.

The low ester pectin may have high reactivity to calcium. For example, the low ester pectin may be particularly reactive to free or available calcium, such as any calcium that may be present in a foodstuff. As such, when a low ester pectin is incorporated into the edible coating composition, the edible coating composition has high reactivity to any available calcium comprised in the foodstuff (e.g., calcium present on the surface of the foodstuff).

In some embodiments, the pectin of the non-crystalline phase includes a degree of methoxylation or esterification that is at or below about 50%, including any specific or range of degrees of methoxylation or esterification comprised therein. In some embodiments, the pectin of the non-crystalline phase includes a degree of methoxylation or esterification that is at or below about 25%, including any specific or range of degrees of methoxylation or esterification comprised therein. In some embodiments of the non-crystalline phase, the pectin comprises a degree of methoxylation that ranges from about 4% to about 10%, including any specific or range of degree of methoxylation comprised therein.

In some embodiments of the non-crystalline phase, the pectin comprises a degree of methoxylation or esterification that is about 4%, about 4.5%, about 5%, about 5.5%, about 6%, about 6.5%, about 7%, about 7.5%, about 8%, about 8.5%, about 9%, about 9.5%, about 10%, about 10.5%, about 11%, about 11.5%, about 12%, about 12.5%, about 13%, about 13.5%, about 14%, about 14.5%, about 15%, about 15.5%, about 16%, about 16.5%, about 17%, about 17.5%, about 18%, about 18.5%, about 19%, about 19.5%, about 20%, about 20.5%, about 21%, about 21.5%, about 22%, about 22.5%, about 23%, about 23.5%, about 24%, about 24.5%, or about 25%. In some embodiments, the degree of methoxylation or esterification ranges from about 7.0% to about 8.5% or from about 7.4% to about 8.0%. In some embodiments, the degree of methoxylation or esterification is about 7.4%, about 7.7%, or about 8.0%.

In some embodiments, the pectin of the non-crystalline phase is not amidated (i.e., non-amidated), such that is has no degree of amidation (i.e., 0% amidation). In some embodiments, the pectin of the non-crystalline phase comprises a degree of amidation that is below 14%, including any specific or range of degrees of amidation comprised therein. For example, in some embodiments, the pectin has a degree of amidation that ranges from about 0% to about 14%, including any specific or range of degree of amidation comprised therein. In some embodiments, the degree of amidation of the pectin of the non-crystalline phase is about 1%, about 2%, about 3%, about 4%, about 5%, about 6%, about 7%, about 8%, about 9%, about 10%, about 11%, about 12%, or about 13%.

In some embodiments, the gelling agent includes a hydrocolloid that is not pectin. Gelling hydrocolloids are capable of eliminating or reducing the negative consequences of moisture migration from the foodstuff towards the edible coating composition. The gelling hydrocolloids provide this capability due in part to their formation of a uniform, three-dimensional gelled matrix throughout the entire non-crystalline phase, thereby preventing or slowing down the degradation of the edible coating composition into an undesirable gooey and sticky texture (e.g., such as a composition that remains on your fingers when touched). In some embodiments, the hydrocolloids added to the non-crystalline phase in a non-gelled state include, but are not limited to gellan gum, carragheenans, alginates, agar, or a combination thereof. In some embodiments, the non-crystalline phase does not comprise additional hydrocolloids.

In some embodiments, the gelling hydrocolloids are calcium reactive. To keep the gelling hydrocolloid(s) in the non-gelled state before and during the industrial application of the edible composition to a foodstuff by any method (e.g., by means of a glaze curtain or dipping), one or more sequestrants may be added to the non-crystalline phase of the edible coating composition. The one or more sequestrants (or "sequestering agents") of the non-crystalline phase are added to the edible composition to sequester calcium ions or other divalent or trivalent cations, which could cause premature gelling of the gelling hydrocolloids, and prevent them from reacting to the hydrocolloids or other gelling agents.

Exemplary sequestrants of the edible composition are selected from sodium citrates, such as trisodium citrate, pyrophosphates, polyphosphates, and/or Glucono-delta-lactone (GdL). In some embodiments, a polyphosphate is included in the non-crystalline phase to sequester free calcium. In some illustrative embodiments, the polyphosphate is sodium hexametaphosphate (SHMP), which is included in the non-crystalline phase to sequester free calcium. In some embodiments, the sequestrant is present in the edible coating composition in an amount of about 0.01%, about 0.02%, about 0.03%, about 0.04%, about 0.05%, about 0.06%, about 0.07%, about 0.08%, about 0.09%, or about 0.10% by weight. In one embodiment, the edible coating composition does not comprise a sequestrant.

In some embodiments, an acidifier may also be present in the non-crystalline phase of the present edible coating composition. The acidifier may affect the gelation of the non-gelled pectin when the edible coating composition interacts with the foodstuff. Further, an acidifier may reduce or prevent the growth of pathogenic bacteria.

An exemplary acidifier for the edible food coating is citric acid, tartaric acid, sodium acid pyrophosphate, and Glucono-delta-lactone (GdL). In some embodiments, the acidifier is present in an amount equal to or less than 1% by weight, including any specific or range of acidifier comprised therein. In some embodiments, the acidifier is present in an amount ranging from about 0.01% to about 1.0%. In some embodiments, the acidifier is present in an amount of about 0.01%, about 0.10%, about 0.15%, about 0.20%, about 0.25%, about 0.30%, about 0.35%, about 0.40%, about 0.45%, about 0.50%, about 0.55%, about 0.60%, about 0.65%, about 0.70%, about 0.75%, about 0.80%, about 0.85%, about 0.90%, about 0.95%, or about 1.00% by weight. In one embodiment, the edible coating composition does not comprise an acidifier.

In some embodiments, the additional hydrocolloids (i.e., not pectin) and/or any sequestering agents are present in a total amount ranging from about 0.01% to about 2.0% by weight, including any specific or range of percentage comprised therein. In some embodiments, the additional hydrocolloids and/or sequestering agents are present in a total amount ranging from about 0.1% to about 0.5%, from about 0.25% to about 1.25%, from about 0.50% to about 1.50%, or from about 0.75% to about 1.75% by weight, including any specific or range of percentage comprised therein. In some embodiments, the additional hydrocolloids and/or sequestering agents are present in a total amount ranging from about 0.01% to about 0.5% by weight, including any specific or range of percentage comprised therein. In some embodiments, the additional hydrocolloids and/or sequestering agents are present in an amount of about 0.01%, about 0.02%, about 0.025%, about 0.030%, about 0.035%, about 0.040%, about 0.045%, about 0.050%, about 0.055%, or about 0.060% by weight.

In some embodiments, both the crystalline and non-crystalline phases of the edible coating composition may comprise additional carbohydrates, such as monosaccharides, disaccharides, and polyols. Both the non-crystalline phase and the crystalline phase of the edible coating composition may also comprise other carbohydrates. These additional carbohydrates may appear as crystals in the crystalline phase and/or as solutes in the non-crystalline phase of the edible coating composition.

Although the non-crystalline phase is largely responsible for the gloss and transparency of the edible coating composition, the non-crystalline phase is also primarily responsible for runoff and stickiness of the edible composition. Especially for coated foodstuffs packed in airtight containers, maintaining the proper balance between the crystalline and non-crystalline phases during the entire shelf-life or storage period of the coated foodstuff is useful to secure both stability of the coating and foodstuff, as well as a long lasting attractive appearance. For example, proper balance of the crystalline and non-crystalline phases is configured to secure a glossy coating, such as in some embodiments, a transparent gloss on the foodstuff.

In addition to the crystalline and non-crystalline components, the present edible coating composition comprises additional characteristics that are important for its performance and stability. In some embodiments, the edible coating composition can be characterized by the amount or percentage of dry matter content (DMC). The DMC of the edible coating composition is calculated or determined as follows.

$$\%\ \text{Dry Matter Content}\ (DMC) = \frac{M2}{M1} \times 100 \qquad \text{Formula I}$$

M1 is the weight of the initial edible coating composition having a crystalline and non-crystalline phase. M2 is the weight of the edible coating composition after drying (e.g., in an oven or some other drying mechanism or device). In some embodiments, the dry matter content ranges from about 48% to about 85%, about 55% to about 85%, about 48% to about 75%, from about 49% to about 69%, or about 50% to about 65%, including any specific or range of content comprised therein. In some embodiments, the dry matter content of the edible coating composition is about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, and about 85%. In some embodiments, the dry matter content is greater than or equal to about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, or about 85%.

In some embodiments, the pH of the edible coating composition has a value of about 7.0 or less, including any specific or range of pH comprised therein. In some embodiments, the pH is about 6.0 or less, including any specific or range of pH comprised therein. In some embodiments, the pH of the edible coating composition is about 5.0 or less, including any specific or range of pH comprised therein. In some embodiments, the pH of the edible coating composition is about 4.0 or less, including any specific or range of pH comprised therein.

In some embodiments, pH of the edible coating composition ranges from about 3.0 to about 5.5, including any specific or range of pH comprised therein. In some embodiments, the pH of the edible coating composition ranges from about 3.5 to about 8.0, about 4.0 to about 7.0, from about 4.0 to about 6.0, from about 4.0 and about 5.0, from about 4.0 to about 4.5, from about 4.2 to about 4.5, from about 3.6 to about 4.5, from about 4.3 to about 4.5, from about 4.0 to about 4.3, about 3.5 to about 4.3, and about 3.7 to about 4.2, including any specific or range of pH comprised therein. In some embodiments, the pH of the edible coating composition is at least 4.0.

In some embodiments, the pH of the edible coating composition ranges from about 4.0 to about 7.0, from about 4.0 to about 6.0, from about 4.0 and about 5.0, from about 4.0 to about 4.5, and from about 4.0 to about 4.3, including any specific or range of pH comprised therein. In some embodiments, the pH of the edible coating composition is about 4.5. In some embodiments, the pH of the edible coating is about 3.5, about 3.6, about 3.7, about 3.8, about 3.9, about 4.0, about 4.1, about 4.2, or about 4.3. In some embodiments, the pH of the edible coating composition is about 4.3. In some embodiments, the pH of the edible coating composition is not below 4.0.

In some embodiments, the edible coating composition comprises free or ionized calcium (Ca2+) in an amount of about 5 ppm or less, including any specific or range of pH comprised therein. In some embodiments of the edible coating composition, the free or ionized Ca2+ is present at below 5 ppm. For example, in some embodiments of the edible coating composition, the free or ionized Ca2+ is present from about 1 ppm to about 4.9 ppm, from about 2 ppm to about 4.9 ppm, from about 3 ppm to about 4.9 ppm, from about 4.0 ppm to about 4.9 ppm, including any specific or range of pH comprised therein, such as about 4.0 ppm, about 4.1 ppm, about 4.2 ppm, about 4.3 ppm, about 4.4 ppm, about 4.5 ppm, about 4.6 ppm, about 4.7 ppm, about 4.8 ppm, and about 4.9 ppm.

In some embodiments of the edible coating composition, the free or ionized Ca2+ is present at about 0 ppm. The edible coating composition may further comprise a Ca2+ sequestering agent ("sequestrant"). In some embodiments of the edible coating composition, the free or ionized Ca2+ is present at about 0 ppm due to the presence of a Ca2+ sequestering agent. Previously identified sequestrants may be used to sequester Ca2+. For example, the sequestering agent may comprise sodium hexametaphosphate (SHMP).

The method and edible coating composition of the present disclosure promote reduced viscosity and consistent processing by in situ gelation. In situ gelation refers to the ability of the gelling agents and/or hydrocolloids of the present edible coating to instantaneously, automatically, and/or progressively in real-time, upon contact with the foodstuff or substrate, form a gel from within and through the total mass of the coating layer after application atop of one or more surfaces of the foodstuff or substrate. Specifically, the gelling agents, hydrocolloids, and/or components can, upon contact with the foodstuff, form a protective layer that extends tackiness-free or stickiness-free shelf-life of a coated food product. This benefit is especially observed when the foodstuff (e.g., coated foodstuff or food product) is packed in an airtight container.

In some embodiments, the present edible coating composition further comprises one or more components that generate in situ gelation after contacting a foodstuff. In some embodiments, the foodstuff, the coated foodstuff, or coated food product can be a donut, such as an uncoated donut. The donut may be a yeast raised donut or cake donut. The donut may also be a glazed yeast raised donut or an iced yeast raised donut. The donut may further be a glazed cake donut or an iced cake donut. In other embodiments, the foodstuff is not a donut, but is instead some other foodstuff or edible substrate (as described herein).

Illustratively, the glazed or iced yeast raised donut or the glazed or iced cake donut may be packed in an airtight container and held for a storage period. For example, the storage period or shelf-life of the coated donut may be any time period, including but not limited to, less than about 24 hours, including any specific or range of time comprised therein. The storage period may range from about 3 to about 24 hours, including any specific or range of time comprised therein. In other embodiments, the storage period or shelf-life of the coated products can range from about 24 hours to about 72 hours (i.e., 1-3 days), including any specific or range of time comprised therein.

The present edible coating composition further provides the ability to eliminate fats. In many conventional and traditional icings or glazes, fats and/or oils are added to improve elasticity and flexibility of the icing or glaze. Typically, fats also aid in the attachment of the edible coating composition to the supporting foodstuff, and/or stability upon freezing, frozen storage & transport and/or defrosting. However, embodiments of the present edible composition comprise little to no fat (e.g., emulsifiers), such as at our about 0% fat. In some embodiments, the present edible composition comprises less than about 1% fat (e.g., emulsifiers), including any specific or range of fat comprised therein.

More specifically, the gel formed as a result of the in-situ gelation of the edible composition after contacting the foodstuff attributes the necessary elasticity, flexibility, improved attachment, and freezer stability to the coated foodstuff that is similar to or better than the result produced after the addition of fats to a coating. As a result, the present edible coating composition may totally or partially eliminate the need or use of fat.

The elimination of fat from the present edible coating composition provides various benefits, such as no generation of a fatty or waxy mouthfeel, no risk of rancidity or generation of other off notes related to fat degradation. Exclusion of fats means there is no longer concern of the physical and chemical stability of the glaze or icing prior to application onto a foodstuff or substrate (particularly as a bulk ingredient). Exclusion or reduction of fat content further enables lower temperatures of application of the glaze or icing onto a foodstuff or substrate, which enables increased shelf-life and storage life of the edible coating composition.

In addition, since no fat crystals need to melt in order to reduce viscosity and/or allow uniform coating, the present edible coating composition provides no risk and/or prevents, reduces, and/or inhibits fat blooming during storage or shelf life and/or freezing or defrosting. Further, the present edible composition is absent of saturated fats (as most fats applied in glazes or icings have a high level of saturated fats), and consequently, a reduction in calorie levels and caloric content as compared to prior art edible coatings and compositions that include fat. The significant reduction and/or elimination of fats from the present edible coating composition provides an improved health and structure that is a technical benefit of the corresponding coated foodstuff over prior art coated foodstuffs.

In some embodiments, the edible coating composition further comprises glycerin. Glycerin is useful to control or affect water activity ($A_w$). When glycerin is added to the edible coating, the $A_w$ is decreased. When glycerin is removed from the present edible coating composition, the $A_w$ increases. In some embodiments, glycerin is present in the edible coating composition in an amount equal to or less than 5% by weight, including any specific or range of amounts comprised therein. In some embodiments, glycerin is present in an amount of about 5%, about 4%, about 3%, about 2%, or about 1% by weight. In some embodiments, the edible coating composition does not comprise glycerin.

In some embodiments, the edible coating composition further comprises potassium sorbate. The potassium sorbate may be included as a preservative to reduce or prevent the growth of microorganisms, such as to extend the mold and yeast free shelf-life of the glaze. In some embodiments, the potassium sorbate is present in an amount equal to or less than 0.50% by weight, including any specific or range of amounts comprised therein. In some embodiments, potassium sorbate is present in an amount of about 0.50%, about 0.04%, about 0.03%, about 0.02%, about 0.01%, about 0.0095%, about 0.005%, or 0.001% by weight. In some embodiments, the edible coating composition does not include potassium sorbate.

In some embodiments, the edible coating composition further comprises an emulsifier. The emulsifier may be present in an amount ranging from about 0.01% to about 1.0% by weight, including any specific or range of amounts comprised therein. In some embodiments, the emulsifier is present in an amount of about 0.001%, about 0.01%, about 0.1%, or about 1.0% by weight. In some embodiment, the edible coating composition does not comprise an emulsifier.

In some embodiments, the water activity ($A_w$) difference between the edible coating composition and the foodstuff can be engineered or manipulated (e.g., by adding sucrose and/or glycerin). This manipulation of the water activity differential between the edible coating composition and the foodstuff may result in an $A_w$ difference ranging from about 0.02 to about 0.08, from about 0.03 to about 0.06, from about 0.035 to about 0.08, from about 0.04 to about 0.08, from about 0.033 to about 0.08, from about 0.033 to about 0.07, from about 0.035 to about 0.06, or from about 0.03 to 0.061, including any specific or range of amounts comprised therein. In some embodiments, the $A_w$ difference between the edible composition and the foodstuff is greater than about 0.02, greater than about 0.03, or greater than about 0.035.

In some embodiments, sucrose and/or glycerin are added to the edible coating composition to affect the $A_w$. In some embodiments, the $A_w$ difference between the foodstuff and edible coating composition is correlated to the glossiness of the edible coating composition such that the greater the difference in $A_w$ between the foodstuff and edible coating composition, the less glossy is the edible food coating. For example, a specified $A_w$ difference between the foodstuff and edible coating composition is capable to produce a glossy sheen on the edible coating composition. In some embodiments, there is no difference, negligible difference, or a small difference in $A_w$ between the edible coating composition and the foodstuff, such that a glossy edible food coating will be observed.

The $A_w$ of the edible coating composition of the present disclosure, including a fondant-like coating product, can be engineered and adjusted by varying sucrose levels in the non-crystalline phase. Some of the method embodiments described herein provide for adjusting low molecular solutes, including but not limited to, fructose, sorbitol, or glycerin, individually or in combination, to engineer, manipulate, and/or obtain a targeted $A_w$ difference level between the foodstuff and the edible composition. The goal being that the targeted $A_w$ difference level between the foodstuff and the edible composition is within the described ranges in order to facilitate the benefits and advantages provided by the edible coating composition herein.

While minimizing the difference of the $A_w$ between the edible composition and the support foodstuff (e.g., substrate) will control moisture migration from the foodstuff to the coating, the gradual moisture increase of the non-crystalline phase will also result in degradation of the coating. Degradation and/or deterioration of the edible composition is observed when it becomes more gooey and sticky over the shelf-life of the food product, especially when packed in an airtight container. However, the present edible coating composition results in a much slower pace of degradation or deterioration compared to traditional sucrose based glazes. In some embodiments, the edible composition or method of making the same comprise components or steps that prevent or reduce stickiness or tackiness over time by in situ gelation.

In some embodiments, the edible coating composition is applied to the foodstuff in a layer that contacts the foodstuff. Typically, the layer of edible coating composition is applied to the top and/or outer surfaces of the foodstuff. The layer of edible coating composition may comprise a thickness ranging from about 0.2 mm to about 5 mm, including any specific or range of thickness comprised therein. Application of the edible coating composition (e.g., a glaze or icing) atop a foodstuff (e.g., a yeast-raised or a cake donut) generally results in transparency and glossiness of the edible coating.

The present disclosure is directed to a method of producing a coated foodstuff or applying the edible coating composition to a foodstuff. Specifically, an edible coating composition may be applied to a foodstuff to generate a coated food product or a coated foodstuff. The edible coating composition is not absorbed or is minimally absorbed by the foodstuff during application.

For example, in some embodiments, less than about 1% of the coating is absorbed by foodstuff) In other embodiments, the amount of edible coating absorbed by the foodstuff is unquantifiable as it is so miniscule. The edible coating composition is also not absorbed by the foodstuff during the shelf or storage life of the foodstuff or food product (e.g., a pastry or a donut). Therefore, the edible coating composition of the present disclosure is shelf-stable and freeze-stable.

The edible coating composition may be used or applied as a fondant, an icing, a glaze or any other type of coating for foodstuffs. In some embodiments, the edible composition is applied to the foodstuffs and subsequently dried. In some embodiments, the edible composition can be applied to partially or completely coat the top or outer surfaces of the supporting foodstuff (e.g., about 5% to about 100%).

In an illustrative embodiment, about 50% to about 100% of the outer surface of the foodstuff is contacted by the edible coating composition, including any specific or range of percentage of the outer surface comprised therein. In an exemplary embodiment, about 50% to about 100% of the top surface of the foodstuff is contacted by the edible coating composition. In one embodiment, any portion (e.g., less than about 5% to about 100%, including any specific or range of percentage of the outer surface comprised therein), of the top or the outer surface of the foodstuff may be contacted with the edible coating composition In some embodiments, the edible composition is directly applied onto the foodstuff with no intervening product or material between the foodstuff and the edible coating composition. In other embodiments, the edible coating composition may be indirectly applied onto the foodstuff, such that there may be one or more intervening products, layers, materials, compositions, or compounds between the outer surface of the foodstuff and the edible coating composition. In an exemplary embodiment, the edible composition is directly applied onto the outer surface of the foodstuff. In some embodiments, the foodstuff is dipped into the edible coating composition.

In some embodiments, the edible coating composition may permeate, penetrate, and/or even migrate from the outer surface of the foodstuff to an inner portion of the foodstuff. In such an embodiment, the edible coating composition primarily remains on the outer surface of the foodstuff, such that no more than about 10% to about 50%, including any specific or range of percentage of coating comprised therein, remains on the outer surface of the foodstuff. In a preferred embodiment, the edible coating composition does not permeate or migrate into the inner portion of the foodstuff at all.

In some embodiments, gelling of the edible coating composition, typically after contacting the edible coating composition with the foodstuff, is a result of migration of free calcium from the foodstuff to the edible coating composition. Calcium, necessary to produce the in situ gelling reaction or gelling of the coating, may be naturally provided in the ingredients used to make a foodstuff. For example, calcium comprised in foodstuff ingredients, such as flour, raising agents, dairy, eggs, cocoa, and other ingredients of a fried or baked foodstuff, may provide the necessary amounts of calcium to produce the advantageous in situ gelling character of the present edible coating composition.

In some embodiments, calcium necessary to produce the in situ gelling reaction or gelling characteristic of the edible coating composition may be artificially provided to the foodstuff or the coating. In some embodiments, a composition comprising calcium may be combined with, contacted to, and/or applied upon the outer surface of the foodstuff prior or subsequent to the application of the edible coating composition onto the foodstuff. This addition of calcium external to the foodstuff is sufficient to impact and/or promote gelling properties of the edible coating composition in decreased time. In other embodiments, the foodstuff may be enriched by some internal addition of calcium during production and prior to the application of the edible coating composition onto the foodstuff.

In some embodiments, an artificial addition of a calcium source may be intentionally added to one or more calcium-containing ingredients of the edible food substrate. For example, calcium could be added as a supplement to a powder mix from which the foodstuff may be prepared (e.g. a donut mix). In another example, calcium-containing ingredients may be a dairy based ingredient (e.g., milk), a calcium based raising agent, or other calcium containing salts.

Other ingredients may also be added to the foodstuff (e.g. powder) mix that may promote the in situ gelling. In some embodiments, the other ingredients of the edible coating may include calcium and other polyvalent cations. The availability of these cations can also be controlled indirectly by the addition of food acids and/or sequestrants. In some embodiments, the ingredients to produce the foodstuff do not include additional calcium, such as additional calcium salt.

In some embodiments, the present edible coating composition showed improved stability, such as "freezer stability." In some embodiments, the edible coating composition was not prone to "sugar blooming." Without being limited by theory, sugar blooming in frozen and defrosted donuts is known in the art to create unappealing physical deformations, such as bloom crystals, on the surface of the foodstuff that might result from the over-saturation of the non-crystalline phase of the edible coating. Such over-saturation can be caused by dehydration (e.g., due to inferior packaging) and/or temperature fluctuations during frozen storage and/or transport.

When the crystalline phase comprises carbohydrates that have a lower solubility compared to sucrose, the lower solubility carbohydrates will likely result in prevention or reduction (e.g., a reduced level) of super-saturation of the non-crystalline phase of the edible composition as a consequence of dehydration and/or temperature fluctuations under frozen conditions. Such reduced level of super-saturation of the edible coating composition will prevent or strongly limit formation of bloom crystals in frozen or defrosted products prepared according to the present disclosure comprising the edible coating composition.

In contrast, observations with sucrose based traditional icings or glazes does not show significant prevention or reduction of sugar bloom. In some embodiments, the edible coating composition comprises other molecular solutes in the non-crystalline phase, in combination with sucrose or as a replacement to sucrose, which can further prevent or reduce sugar "blooming" or the formation of crystal blooms on the outer surface of the foodstuff and/or edible composition (e.g., the coated foodstuff).

The coated food products of the present disclosure, including the foodstuff and the edible coating composition, are aesthetically pleasing and palatably favorable to a consumer. In particular, the disclosed edible coating compositions are configured to provide a smooth mouthfeel to a consumer. A smooth mouthfeel typically includes palatability by a consumer that is without grittiness, tackiness, and/or stickiness over the entire shelf life of the food product or foodstuff until the time of consumption by a consumer, such as a person.

While the texture of coated food product of the prior art may also become tacky, sticky, and/or undesirable by a consumer, disclosed herein are edible coating compositions and methods of making and/or producing an edible coating composition or a coated food product to prevent or reduce the effect of the migration of moisture from the foodstuff into the edible coating composition causing sugar bloom and an unsmooth mouthfeel that is not desirable by a consumer. The present compositions and methods produce a more stable food product with a longer shelf-life that is more aesthetically and palatably pleasing to a consumer.

In addition, the coated food products comprising the edible coating compositions of the present disclosure provide an improved stability and increased shelf or storage life. In some embodiments, improved stability of the edible coating composition or coated food product refers to the advantageous feature of the ability of the edible coating composition to stay or remain on the top and/or outer surfaces of the foodstuff for an extended period of time (e.g., shelf or storage life) rather than falling to the bottom outer surface of the foodstuff or in the packaging. In an exemplary embodiment, the improved stability of the edible coating composition or coated food product extends for a duration of up to about 3 weeks to about 6 weeks (e.g., about 21 to about 45 days), including any specific or range of time comprised therein.

This shelf and/or storage stable time may be further extended when the coated foodstuff is packed in an airtight container. In some embodiments, the airtight container further comprises a means, a mechanism, a composition, a compound, and/or a material, such as an antimicrobial composition prevent microbial spoilage of the coated food product. Exemplary antimicrobial components that may be added to the packaging container of the present coated foodstuff may include, but is not limited to silver or sterilized packaging.

In some embodiments, improved stability refers to the edible of the edible coating composition or coated food composition remaining stable during "ambient shelf life" in airtight packing. During ambient shelf life, the edible coating composition, including the glaze or icing, applied to the foodstuff will not degrade, move, and/or flow down the foodstuff, but will remain in place where applied (see FIGS. 2A and 2B). In addition, improved stability of the edible coating composition also provides that the coating will not become wet, syrupy, tacky, or sticky. In addition, improved stability during ambient storage or shelf life in airtight packing, comprises an improved feature that the edible composition will not stick to the foodstuff packaging and will also not stick to fingers or utensils of a consumer while being consumed (see FIGS. 2A and 2B), such as is the case for traditional or conventional icings or glazes (see FIGS. 3A and 3B). In some embodiments, improved stability refers to "freezer stability." For example, upon freezing, frozen storage or transport, and/or defrosting of coated food products, the edible coating composition does not show irregularities such as "lifting." "Lifting" occurs when the edible coating composition is or becomes locally or totally detached from the supporting foodstuff, demonstrates sugar bloom development, or becomes dissolved by drops of condensation.

Herein, freezing includes any freezing conditions, particularly freezing at −20° C. to about −140° C., including any specific or range of freezing temperatures comprised therein. More specifically, freezing of the coated food product may comprise use of a household freezer, an industrial freezer, a spiral freezer, and a blast freezer, and/or a cryogenic freezer. Under all freezing conditions, the edible coating composition demonstrates improved freeze/thaw stability.

In some embodiments, the present methods and compositions may comprise a container. In some embodiments, the container is sealed, unsealed, airtight, or permeable. In some exemplary embodiments, the container is an airtight container.

In some embodiments, the airtight container may be any type of container, package, or packaging that prevents, reduces, or slows down the transfer of moisture (e.g., water vapor) between the inside and the outside of the packaging. Any packaging for containing food or edible items may be used in the subject disclosure. In some embodiments, the packaging may include, but is not limited to clam shells, non-perforated wraps, deli cups, or the like.

In this way, a packaged and coated food product can be kept stable for many days (e.g., between about 2 days to about 7 days, including any specific time period comprised therein) or even weeks (e.g., between about 2 weeks to about 16 weeks, including any specific time period comprised therein) of a storage period or shelf life at ambient conditions, while preventing the drying out of both the edible coating composition and the foodstuff. As used herein "ambient conditions" refer to the general conditions, including light, temperature, and moisture content, in a given area. Specific to this disclosure, ambient conditions are those known in the food industry for handling and storing coated foodstuff. In some embodiments, the airtight container in combination with the food product prevents excessive condensation of moisture or blooming on the coated foodstuff upon defrosting, or in climate conditions combining extremely high relative humidity with high temperatures, such as temperatures up to about 40° C. combined with relative humidity levels of about 80% or more. In the industry, a food product contained in an airtight container may be referred to as an "airtight packed" food product.

In some embodiments, an edible coating composition of the coated food product remains stable in an airtight container for at least 24 hours. In some embodiments, the edible coating composition remains stable for at least 24 hours, at least 36 hours, at least 48 hours, at least 60 hours, at least 72 hours, at least 84 hours, or at least 96 hours. The edible coating composition may remain stable for about 24 to about 120 hours, including any specific or range of time comprised therein.

In some embodiments, the edible coating composition has an extended stickiness-free or tackiness-free shelf life or storage period of the coated food product that ranges from about one week to about 16 weeks in length, including any specific or range of times comprised therein. In some embodiments, the edible coating composition has an extended stickiness-free or tackiness-free shelf life or storage period of the coated food product that is at least about one week, about two weeks, about four weeks, about six weeks, about eight weeks, about ten weeks, about 12 weeks, or about 16 weeks in length. For example, an edible coating composition comprising the gelling hydrocolloid(s) may have an even further extension of shelf life or storage stability.

In some embodiments, the method of producing or making a coated food product or an edible coating composition of the present disclosure comprises combining a saturated solution of isomaltulose with sucrose to generate the non-crystalline phase. The method further comprises adding isomaltulose to the non-crystalline phase.

The method of making or producing the edible coating composition of the present disclosure comprising a two-phase system. The method comprises making a first crystalline phase and a second non-crystalline phase in a specific ratio, wherein the crystalline and non-crystalline phases comprise components that result in functional, structural, and improved palatable properties of the resulting coated foodstuff. Thus, the present method preserves the balance between a crystalline phase and a non-crystalline phase, which advantageously improves the consumer palatability satisfaction of the coated food product after storage or shelf-life.

The edible compositions described herein comprise gelling agents in a non-gelled state. In some embodiments, an edible composition comprises a crystalline phase and a non-crystalline phase, and further comprises a gelling agent in a non-gelled state prior to contacting a foodstuff. Keeping one or more of these gelling agents in the edible composition in a non-gelled state prior to and during application onto a foodstuff will also provide a lower viscosity of the edible coating upon application of the edible composition on the supporting foodstuff to support in situ gelation as compared to an edible composition comprising a gelling agent in a gelled state.

The resulting edible coating composition demonstrates smooth flowing characteristics, even at temperatures between ambient temperatures (e.g., about 18° C. to about 25° C.) and 40° C. The resulting edible coating composition also enables formation of a uniform and wrinkle free glaze or glaze curtain, while limiting moisture loss during industrial operation. Besides the use of a glaze curtain, the edible coating can also be applied on the foodstuff by enrobing, dipping, sprinkling, spraying, brushing, or any other means known in the food arts.

In some embodiments of application (e.g., industrial application) of the edible coating composition onto the foodstuff, the addition of gelling agents to the edible composition in a non-gelled state results in a reduction of glaze pick up per unit of foodstuff during industrial application via a glaze curtain. The glaze pick up per unit refers to the amount of glaze that is applied to and retained on the foodstuff. In some embodiments, the glaze pick up per unit of foodstuff (e.g., a donut) ranges from about 5 grams to about 20 grams per unit of foodstuff, including any specific amount or range of glaze per unit comprised therein. In some embodiments, the glaze pick up per unit of foodstuff ranges from about 9 grams to about 16 grams per unit, from about 10 grams to about 15 grams per unit, from about 14 to about 21 grams per unit, or from about 15 to about 20 grams per unit, including any specific amount or range of glaze per unit comprised therein.

The lower viscosity of the edible composition resulting from the non-gelled state of the additional gelling agent may range from about 10 to about 80 Pa·s, measured at a shear rate of 1 $s^{-1}$ and at a temperature of 20° C., including any specific or range of viscosity comprised therein. This lower viscosity of the edible composition also results in thinner glaze curtains and faster passage of each unit of foodstuff through the glaze curtain. Moreover, the in situ gelation of the edible coating composition will also prevent the edible coating composition from being absorbed into the supporting foodstuff, or from flowing down or running off of the supporting foodstuff during ambient shelf-life in an airtight container. This undesired running or flowing phenomenon is well known, especially when applying low viscous glazes or icings, which do not comprise such gelling agents (e.g., hydrocolloids) that are (i) configured in a non-gelled state and (ii) providing the in-situ gelling upon contact with the supporting foodstuff.

In some embodiments, the method further comprises reducing the pH level of the outer surface of the edible coating composition, which generally ranges from about 4.0 to about 8.5. In some embodiments, the pH of the foodstuff surface, which is preferably in direct contact with the edible coating composition, will be reduced. In some embodiments, the reduced pH of the foodstuff surface ranges from about 6 to about 9, including any specific pH comprised therein. In one embodiment, the reduced pH of the food stuff ranges from about 6.5 to about 8.5, from 6.5 to about 7.5, or from about 7.0 to about 8.5. In one embodiment, the reduced pH of a yeast-raised donut may range from about 6.5 to about 7.5. In one embodiment, the reduced pH of a cake donut may range from about 7.0 to about 8.5. Such pH reduction of the foodstuff will convert a portion of undissolved calcium (as well as other ions) into its soluble form, thereby making more calcium (and other ions) available to accelerate and strengthen the in-situ gelling reaction of the edible composition.

The edible coating composition may be applied to a frozen foodstuff, such as a foodstuff having a crust (e.g., outer surface portion of the foodstuff) and/or a core (e.g., inner portion of the foodstuff) temperature of about −10° C. or lower, for example −40° C. A cold foodstuff is a foodstuff having a crust and/or a core temperature of about 4° C. An ambient foodstuff is a foodstuff having a crust and/or a core temperature of about 18° C. to about 25° C., including any specific or range of temperature comprised therein. A freshly fried foodstuff is a foodstuff having a crust temperature ranging from about 50° C. to about 200° C., including any specific or range of temperature comprised therein (e.g., 70° C. to about 160° C.). In some embodiments, a core temperature of a foodstuff does not exceed 100° C. when water is present.

In some embodiments, the edible coating composition is applied to a foodstuff that is freshly fried, baked, or frozen. For example, the foodstuff may have a crust and/or a core temperature ranging from about −35° C. to about 200° C., about −25° C. to about 200° C., about −15° C. to about 200° C., about −5° C. to about 200° C., about 0° C. to about 200° C., about 5° C. to about 200° C., about 10° C. to about 200° C., about 0° C. to about 20° C., about 0° C. to about 40° C., about 0° C. to about 60° C., about 0° C. to about 80° C., about 10° C. to about 150° C., about −10° C. to about 10° C., about −10° C. to about 50° C., about −10° C. to about 100° C., about 0° C. to about 100° C., about 25° C. to about 125° C., about 25° C. to about 100° C., about 25° C. to about 85° C., about 25° C. to about 75° C., or about 15° C. to about 95° C. In some embodiments, the edible coating composition may be applied to foodstuffs having a crust and/or a core temperature between −35° C. and 200° C., including any specific or range of temperature comprised therein.

In some embodiments, the freshly fried foodstuff is allowed to cool to a crust and/or a core temperature of less than about 130° C., less than about 125° C., less than about 120° C., less than about 115° C., less than about 110° C., less than about 105° C., less than about 100° C., less than about 95° C., less than about 90° C., less than about 85° C., less than about 80° C., less than about 75° C. In some embodiments, the foodstuff has a crust and/or a core temperature of less than about 70° C., less than about 65° C., less than about 60° C., less than about 55° C., less than about or 50° C., less than about 45° C., less than about 40° C., less than about 35° C., less than about 30° C., less than about 25° C., less than about 20° C., less than about 15° C., less than about 10° C., less than about 5° C., less than about 0° C., less than about −5° C., less than about −10° C., less than about −15° C., less than about −20° C., less than about −25° C., and less than about −30° C.

In some embodiments, the crust temperature of the foodstuff may be greater than the core temperature of the foodstuff. In other embodiments, the crust temperature of the foodstuff may be less than the core temperature of the foodstuff. In further embodiments, the crust temperature of the foodstuff may be the same, similar, or substantially the same or similar to the core temperature of the foodstuff (e.g., crust and core temperatures are within about 5° C. of each other).

The edible coating composition may be applied to a cold foodstuff or a hot foodstuff. In some embodiments, when applying the edible coating composition to a cold foodstuff, the drying time may be increased compared to applying the edible coating composition to a hot foodstuff. To reduce drying time, the edible coating composition may comprise one or more oligosaccharides which may reduce moisture levels in the edible coating composition.

In some embodiments, the foodstuff is frozen, such as at a temperature below freezing. Once the edible coating composition is applied to a frozen foodstuff, the coated foodstuff may be defrosted or transferred back to a frozen storage. Once applied, the coating may be fixed or affixed to one or more surfaces of the foodstuff.

As the frozen, coated foodstuff is defrosted, it is understood that the pectin present in the edible coating composition may gradually transform from a non-gelled to a gelled state due to migration of calcium and/or other polyvalent cations from the foodstuff to the icing during and after thawing. This gelling may contribute to the formation of a coating having one or more of the following properties: non-sticky, elastic, smooth and flexible coating which will not stick to packing materials nor adjacent foodstuffs. Additionally, during, or subsequent to, ambient packed shelf life, the coating will not flow (e.g. to the bottom of the package or container), nor will it migrate to or be absorbed by the foodstuff (e.g., by the crumb and/or the inside of a pastry or donut).

In some embodiments, the edible coating composition further comprises a flavoring. A flavoring may include any component that adds any flavor and/or texture to the edible coating composition. In some embodiments, the flavoring may include, but is not limited to vanilla, chocolate (e.g., cocoa powder), strawberry, orange, pineapple, cinnamon, or maple. In an embodiment wherein flavoring is included in the edible coating composition, the flavoring dissolves into the non-crystalline phase rather than the crystalline phase. In one embodiment, the edible coating composition does not include a flavoring component at all.

Finally, the components of the edible coating composition and methods of application are capable of preventing and/or reducing the effects of moisture migration from the foodstuff to the edible coating composition by controlling the activity of water or the water activity ($A_w$). Reduction of moisture migration also works to reduce the generation of syrup, reducing the solubilization rate, and creates a three-dimensional gelled matrix that stabilizes any generated syrup. Syrup is understood to be a sticky liquid formed from a sugar solution, such as the present edible coating composition. The reduction of moisture migration may also have the advantage of forming a glossy sheen on the edible coating composition.

For example, the present edible coating composition provides about a 50% to about a 100% reduction, including any specific percentage value comprised therein, in the generation of syrup. This reduction of syrup generation is due to a prevention or reduction of moisture migration from the foodstuff to the edible coating composition. The reduced syrup generation also results in reduced or decreased coating slippage off of the foodstuff and into the packaging or container.

Therefore, the present edible coating composition, when applied to a foodstuff, provides an extended shelf-life and/or storage and improved stability, appearance, and mouthfeel compared to a traditional sucrose based coating product. For example, in some embodiments, the edible coating composition is able to demonstrate a glossy appearance over the entire shelf life of the foodstuff after being applied to the foodstuff. In some embodiments, the applied edible coating composition provides a transparent appearance over the entire shelf life of the coated food product. The following examples provide further non-limiting disclosure of the edible coating composition and methods of making the same.

EXAMPLES

Example 1: Exemplary Embodiment of the Edible Coating Composition

Referring to FIG. 1, the edible coating composition of the present disclosure has a lower viscosity ranging from about 50 Pa·s to about 80 Pa·s at a shear rate of 0.1 reciprocal seconds (1/s or $s^{-1}$), including any specific or range of viscosity comprised therein. This lower viscosity of the present edible food coating is compared to the viscosity of a traditional sugar glaze that ranges from about 90 Pa·s to about 120 Pa·s at a shear rate of 0.1 l/s (described in Example 3). The closed-circled line of FIG. 1 shows the viscosity of a traditional or conventional glaze comprising gelling agents (e.g., pectin) in a gelled state. The open-circled line shows the viscosity of the present edible coating composition with gelling agents (e.g., pectin) in a non-gelled state.

As the graph shows, the edible coating composition has a lower viscosity than a traditional or conventional glaze. A lower viscosity may provide advantageous results including easier pumping or application, even glaze curtains, and uniform coating layers. The lower viscosity also provides the edible coating the ability to operate or perform at lower glaze temperatures.

TABLE 1

Components of the Edible Coating Composition

| Ingredients | % | |
|---|---|---|
| Soft water | 20-25 | |
| Sugar | 1.0 | Mix 1 |
| Hydrocolloid blend comprising pectin and sequestrants (e.g., SHMP, Trisodium citrate, gelling agents) | 0.20-2.0 | |
| Low solubility sugar | 9.5 | Mix 2 |
| Granulated sugar in bulk | 14.1 | |
| Glycerin | 0.50-3 | Mix 3 |
| Emulsifiers | 0.01-1.0 | |
| Low solubility sugar | add to 100% | Mix 4* |
| Soft water | 0.62 | Mix 5 |
| Potassium sorbate | 0.1 | |
| Acidifier(s) | 0.10-1.0 | Mix 6 |
| Flavors and/or HIS sweeteners | 0.1-2.0 | |
| Total sum ingredients | 100 | |
| Aw | 0.84 to 0.95 | |
| pH | 3.5-4.5 | |
| Glaze pick up (g/donut) (±1) | 12 | |

*denotes the components of the crystalline phase

Example 2: Exemplary Method Embodiment of Making the Edible Coating Composition—A Glaze Embodiment 1. Heat soft water until boiling point.
2. Mix the sugar with the blend of hydrocolloids and sequestrants (Mix 1).
3. Weigh a metal cylinder plus a spoon.
4. Add pre-heated water to the metal cylinder and heat again to 85° C.
5. Add mix 1 to the hot soft water at 85° C. in the metal cylinder.
6. Mix the solution with a high shear mixer (e.g. type ultra turrax or Silverson) at middle speed during 5 minutes.
7. Add Mix 2 to the metal cylinder.
8. Heat the solution to 92° C. whilst stirring with a spoon.
9. Mix the emulsifiers in the glycerin (Mix 3) with a spoon.
10. Add Mix 3 to the metal cylinder and mix with the high shear mixer at low speed.
11. Cool the solution to 45° C. whilst stirring with spoon: put the metal cylinder with solution in a bowl of cold water (not too cold as then the solution at the side of the cylinder will cool too rapidly).
12. At 45° C.: weigh the solution, spoon and metal cylinder and adjust for the evaporated water.
13. Add Mix 4 (low solubility sugar) slowly and gradually and mix for 3 min with the Morton Z kneader on lowest speed.
    a. Make sure that the low solubility sugar does not form lumps (sieve prior to addition).
    b. Make sure that the water bath of the Morton is set and pre-heated to 45° C.
14. Dissolve the potassium sorbate into soft water and add sorbate solution (Mix 5) to the glaze solution in the Morton and mix for another 30 seconds.
15. Add acidifier, flavors and/or High Intensity Sweeteners (HIS), such as stevia extracts or sucralose (Mix 6) and mix for 1 minute with the Morton Z kneader on lowest speed.
16. Fill the warm glaze in containers and shear for 1 minute at 8000 rpm with the Silverson.
17. Let the glaze cool without stirring (at rest).

The glaze is now ready to be applied to a foodstuff and the foodstuff stored in a packaging, such as an airtight container.

Example 3: Qualitative Test Showing Stability of the Edible Coating Composition

Two coatings were prepared. The first was an embodiment of the edible coating composition. The second was a traditional sucrose based donut glaze known in the prior art. The formulas for the edible coating composition and the traditional sucrose glaze are shown in the Tables 2 and 3.

Table 2 includes an asterisk (*) that denotes Mix 4, where the isomaltulose in this mix comprises the crystalline phase of the edible coating composition. The isomaltulose demonstrates an average particle diameter of about 100 microns or less for at least 90% by weight of the isomaltulose included in Mix 4 to form the crystalline phase. Whereas the sucrose or isomaltulose of Mix 2 goes into solution, such that the crystal size, granularity, and/or fineness is of no consequence.

The two coatings were each applied to a freshly fried yeast raised donut to produce two coated food products. The coated donuts were kept in airtight containers for four days at ambient conditions and checked for stickiness about every 24 hours. The traditional donut glaze did not remain stable past 24 hours ambient shelf life. The following conditions were the same for both coated donuts:

Coating pick up was ±11 g glaze per donut.

Coating was applied at 35° C. on a freshly fried donut.

Yeast raised donuts had an equilibrium water activity of 0.94.

Donuts were monitored during 4 days of ambient storage in airtight container.

TABLE 2

Components of an Edible Coating Composition - A Glaze Embodiment

| Ingredients | % | |
|---|---|---|
| Soft water | 20.00-25.00 | |
| Sucrose | 1.00 | Mix 1 |
| Gellan gum | 0.02-0.10 | |
| Pectin | 0.20-1.00 | |
| SHMP | 0.025-0.100 | |
| Trisodium Citrate | 0.01-0.10 | |
| Isomaltulose | 9.50 | Mix 2 |
| Sucrose | 14.10 | |
| Glycerin | 0.50-3.00 | Mix 3 |
| Emulsifier | 0.01-0.10 | |
| Isomaltulose | Add to 100% | Mix 4* |
| Soft water | 0.62 | Mix 5 |
| Potassium sorbate | 0.10 | |
| Isomaltulose | 2.50 | Mix 6 |
| Acidifiers (citric acid, GDL) | 0.1-1.0 | |
| Flavors and/or HIS sweeteners | 0.1-2.0 | |
| Total sum ingredients | 100.00 | |
| $A_w$ | 0.89-0.93 | |
| pH | 3.6-4.5 | |
| Dry matter content | 72% | |
| Glaze pick (g/donut) (±1) | 11 | |

*denotes crystalline phase components.

TABLE 3

Components of a Traditional Sucrose-based Glaze

| Ingredients | % | |
|---|---|---|
| Water | 16.43 | |
| Sucrose | 2.00 | Mix 1 |
| Hydrocolloid blend (xanthan, LBG, guar) | 0.50 | |
| Emulsifiers (mono- & diglycerides, lecithin) | 0.15 | |
| Sucrose (regular crystal sugar) | 26.00 | Mix 2 |
| Glucose syrup | 13.30 | Mix 3 |
| Invert sugar | 3.30 | |
| Sucrose (fine icing sugar) | 37.30 | Mix 4 |
| Soft water | 0.62 | Mix 5 |
| Potassium sorbate | 0.10 | |
| Citric acid | 0.30 | Mix 6 |
| Total | 100.00 | |

To demonstrate the difference in stickiness, the donuts were taken out of the air tight containers and pressed with the glazed side against a transparent plastic lid. Subsequently, a finger was rubbed over the glazed surface to check stickiness and moisture migration of the edible coating composition on the coated foodstuff. FIGS. 2A-3B demonstrates the improved qualities of the present edible coating composition compared to a traditional glaze or icing.

Figure 2A:
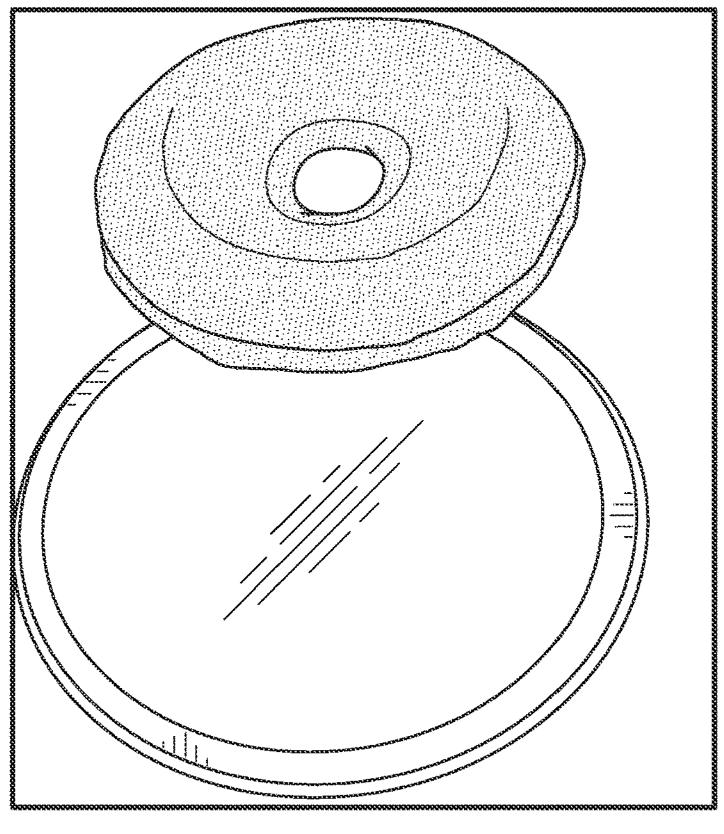
FIG. 2A is a first image of an embodiment of a coated foodstuff product comprising an edible coating composition of the present disclosure applied to a foodstuff (e.g., a donut)

FIG. 2A is a first image of an embodiment of a coated foodstuff product comprising an edible coating composition applied to a foodstuff (e.g., a yeast raised donut) of the present disclosure. FIG. 2A demonstrates improved stability of the coated foodstuff, such that no coating was left on a plastic packaging container lid to which the coated donut was pressed after 96 hours of ambient shelf life in an airtight packaging.

Figure 2B:
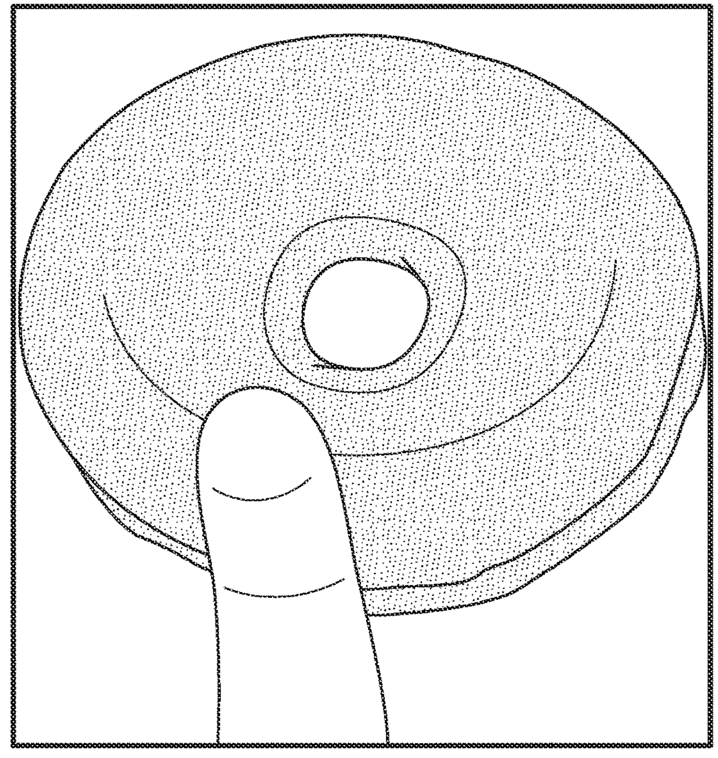
FIG. 2B is a second image of an embodiment of the present coated foodstuff comprising an edible coating composition of the present disclosure applied to a foodstuff (e.g., a donut)

FIG. 2B is a second image of an embodiment of the present coated foodstuff comprising an edible coating composition applied to a foodstuff (e.g., a donut) of the present disclosure. FIG. 2B demonstrates an improved stability of the coated foodstuff, such that no coating was left on the finger of a consumer to which the coated foodstuff came into contact after 96 hours of ambient shelf life in an airtight container. Referring to FIGS. 2A and 2B, the coated foodstuff of the present disclosure comprising the yeast raised donut coated with the edible coating composition demonstrated improved stability in ambient conditions, and remained stable in an airtight container, including no stickiness or tackiness, for about four days (e.g., about 96 hours).

Figure 3A:
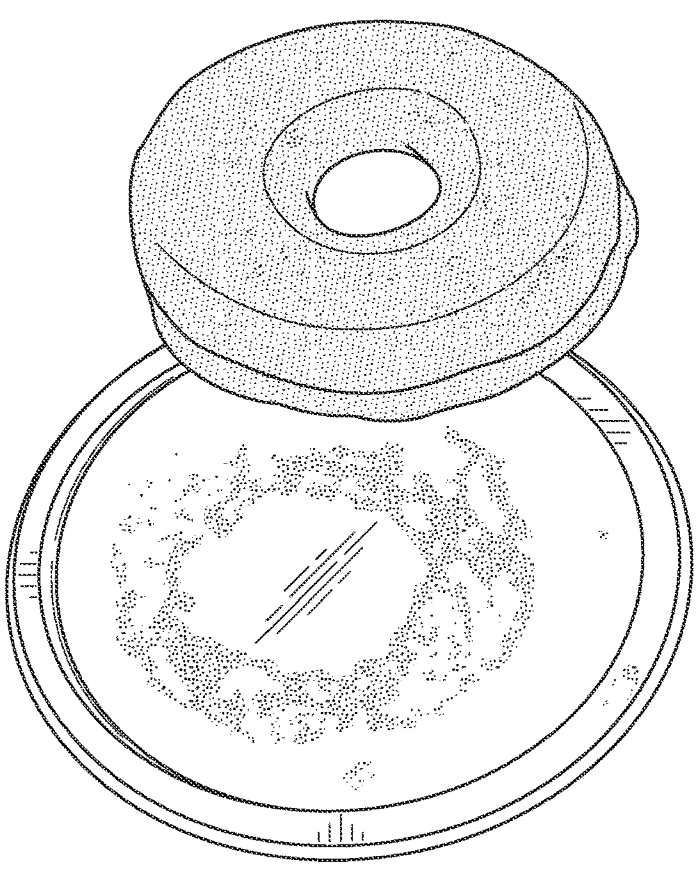
FIG. 3A is a third image of a traditional glazed donut (i.e., coated with a sucrose-based crystal glaze) as taught by the prior art.
Figure 3B:
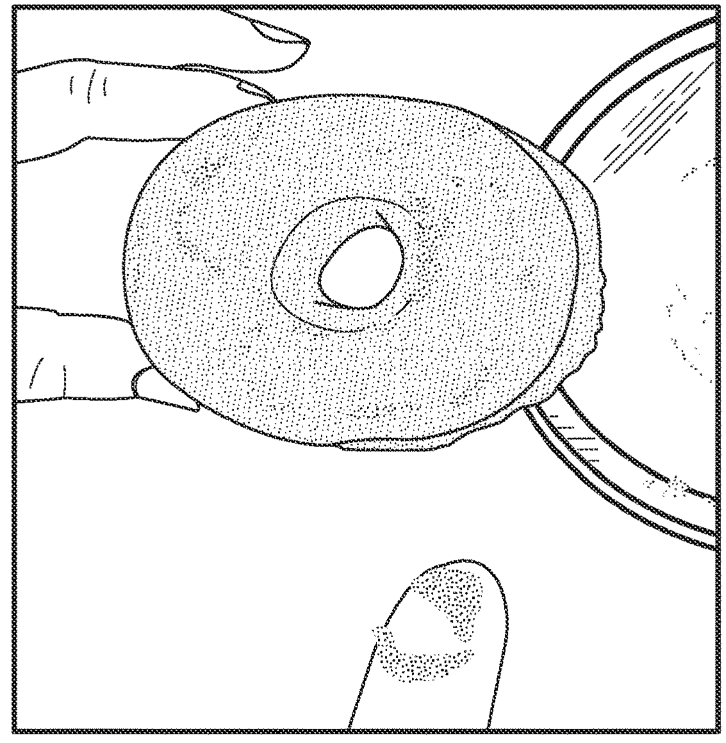
FIG. 3B is a fourth image of a traditional glazed donut (i.e., coated with a sucrose-based crystal glaze) as taught by the prior art.

FIG. 3A is an image of a yeast raised donut glazed with a traditional or conventional sucrose based glaze. FIG. 3A demonstrates that the traditional coating was left on a plastic packaging container lid to which the traditional glazed donut was pressed upon after 24 hours of ambient shelf life in an airtight packaging. FIG. 3B is an image of the traditional glazed donut demonstrating that the sucrose-based coating was left on the finger of a consumer after only 24 hours of ambient shelf life in an airtight container. These data and images demonstrate the edible coating composition of the present disclosure has an improved shelf-stable quality (Shelf stability) particularly when stored in an airtight container. Further, the data shows that the edible coating composition is stable over at least 4 days when contained in an airtight container.

Example 4: Composition and Components of an Edible Icing Coating Composition

Referring to the edible coating composition of Table 4, an icing embodiment can also be prepared. In such an icing embodiment of the edible food coating composition, isomaltulose sugar of a finer grade may be utilized in the crystalline phase. For example, a finer isomaltulose may demonstrate a particle size of about 0.050 mm (50 microns) or less, including any specific or range of size comprised therein. In exemplary embodiment, this finer grade of isomaltulose is at least 90% by weight of the sugar crystals contained in the crystalline phase of the edible food coating. In one embodiment, such a finer grade isomaltulose may be represented by Mix 4.

Crystals in the crystalline phase having an average diameter of 50 microns or less will result in a significant increase in opacity. Increased opacity is a desired attribute and characteristic of the present edible food coating, especially for white icings. While traditional white icings made from sucrose and corn syrup require addition levels of 0.1 to 1% of titanium dioxide in order to enhance opacity, the example in Table 4 does not need any $TiO_2$ addition to reach the desired level of opacity. Moreover, fats, cocoa powder, colors, pigments, and/or flavorings can also be comprised by the icings.

An exemplary embodiment of a white icing for the present disclosure is provided in Table 4 with a similar procedure as outlined in Example 2. An exemplary embodiment of a chocolate icing of the present disclosure is provided in Table 5.

Example 5: Exemplary Method Embodiment of Applying a White Icing to a Donut

1. Heat icing to 45° C.±2° C. (in some embodiments, au bain marie or else in a microwave). In some embodiments, wherein a microwave is used to heat the icing, the icing is heated for equal to or less than 30 seconds without stirring.
2. As the icing approaches desired application temperature, then heat the icing for about 5 to about 10 seconds at a time, stir, and check temperature.
3. Donut should be at ambient temperature of about 18° C. to about 25° C.
4. Just before application, stir the warm icing and then dip in donut icing.
5. Optionally, let the dipped donut dry about 20 minutes after dipping.

TABLE 4

Components of the Edible Coating Composition - A White Icing Embodiment

| Ingredients | % | |
|---|---|---|
| Soft water | 20.00-25.00 | |
| Sucrose | 1.00 | Mix 1 |
| Gellan gum | 0.02-0.10 | |
| Pectin | 0.2-1.0 | |
| SHMP | 0.025-0.100 | |
| Trisodium Citrate | 0.01-0.10 | |
| Isomaltulose | 9.50 | Mix 2 |
| Sucrose | 14.10 | |
| Glycerin | 0.50-3.00 | Mix 3 |
| Emulsifier | 0.01-0.10 | |
| Isomaltulose of a finer grade | Add to 100% | Mix 4 |
| Soft water | 0.62 | Mix 5 |
| Potassium sorbate | 0.10 | |
| Isomaltulose of a finer grade | 2.50 | Mix 6 |
| Acidifiers (citric acid, GDL) | 0.1-1.0 | |
| Flavors and/or HIS sweeteners | 0.1-2.0 | |
| Total sum ingredients | 100.00 | |
| $A_w$ | 0.89-0.93 | |
| pH | 3.6-4.5 | |
| Dry matter content | 72% | |
| Icing pick (g/donut) (±2) | 14 | |

TABLE 5

Components of the Edible Coating Composition - A Chocolate Icing Embodiment

| Ingredients | % | |
|---|---|---|
| Soft water | 20.00-25.00 | |
| Sucrose | 1.00 | Mix 1 |
| Gellan gum | 0.02-0.10 | |
| Pectin | 0.2-1.0 | |
| SHMP | 0.025-0.100 | |
| Trisodium Citrate | 0.01-0.10 | |
| Isomaltulose | 9.50 | Mix 2 |
| Sucrose | 14.10 | |
| Glycerin | 0.50-3.00 | Mix 3a |
| Emulsifier | 0.1-2.0 | |
| Shortening and/or oil | 5.0-10.0 | |
| Cocoa powder | 2.0-8.0 | Mix 3b |
| Isomaltulose of a finer grade | Add to 100% | Mix 4 |
| Soft water | 0.62 | Mix 5 |
| Potassium sorbate | 0.10 | |
| Isomaltulose of a finer grade | 2.50 | Mix 6 |
| Acidifiers (citric acid, GDL) | 0.1-1.0 | |
| Flavors and/or HIS sweeteners | 0.1-2.0 | |
| Total sum ingredients | 100.00 | |
| $A_w$ | 0.89-0.93 | |
| pH | 3.6-4.5 | |
| Dry matter content | 72% | |
| Icing pick (g/donut) (±2) | 14 | |

Example 6: A Method of Making an Edible Coating Composition—A Chocolate Icing Embodiment The chocolate icing of Table 5 may be prepared according to a similar procedure as outlined under Example 2 with the following exemplary differences for Mix 3.

1. Mix 3 is split into a Mix 3a and Mix 3b.
2. Mix 3a is prepared by first warming up shortening and/or oil to 70° C., then subsequently combine glycerin and emulsifiers into the hot fat or oil.
3. Mix 3a is mixed with a spoon with the other ingredients in the metal cylinder.
4. Subsequently, Mix 3b is combined with the metal cylinder and the combination of Mix 3a and Mix 3b is high shear mixed at middle speed for about 3 minutes.
5. The resulting slurry is then cooled to about 45° C. while stirring with a spoon, after which the procedure under Example 2 is being further followed

Example 7: The Edible Coating Composition Reduces the Effects of Moisture Migration In some of the disclosed embodiments, the crystalline phase comprises a sugar having a lower solubility than sucrose. Generally, sucrose is known in the art to have a solubility at room temperature such that 2 grams of sucrose are soluble in 1 cc. of water. Therefore, this lower solubility sugar of the present edible coating composition would have a solubility below 2 grams/cc. of water, which allows for a smaller amount of syrup production at the same rate of moisture migration from the foodstuff to the edible food coating.

For instance, in a traditional sucrose glaze, as described in Table 3, Example 3, one (1) gram or ml of water migrating from the foodstuff into the coating will finally dissolve about 2 grams of sucrose crystals. This moisture migration and dissolution of sucrose comprised in the traditional coating results in the creation of 3 grams of liquid syrup. The syrup often runs off the traditional foodstuff and into a packaging container, which is an undesirable feature of the prior art product, particularly from a consumer perspective.

In contrast, when 1 g or ml of water migrates from the foodstuff to the present edible coating composition, only about 0.5 grams of isomaltulose is dissolved from the crystalline phase of the coating. As such, only about 1.5 grams or mls of liquid syrup is being produced with the same amount of water (1 g or ml) migrating from the foodstuff to the present edible coating. This demonstrates that the present edible coating composition results in about a 50% reduction in the amount of syrup produced for any given amount of moisture migration as compared to traditional coatings.

The reduced syrup production also results in reduced or decreased coating slippage of the coating off of the foodstuff and into the packaging or container. Accordingly, the in situ formation of a gel (e.g., a pectin gel) throughout the three-dimensional (3D) matrix of the present glaze or icing during subsequent application on the supporting foodstuff will also prevent or significantly reduce the flowing down of the generated syrup into the package or container. This 3D gelled matrix further results in a reduction of the coating slippage off of or from atop the foodstuff as compared to the results of a traditional sucrose glaze, which is an advantageous benefit of the present coating composition.

Example 8: A Texture Analysis Confirmed the Edible Coating Maintained a Soft, Fresh Donut with a Reduced Trend Towards Hardness Over Time As discussed herein, the migration of water from a foodstuff to a traditional sucrose-based glaze or icing results in a melted syrup that flows and becomes sticky. Further, the moisture migration from the foodstuff to the glaze or icing removes moisture from the foodstuff, often resulting in a staling effect of the foodstuff. For example, when the sucrose-based glazed donut is then packed in an airtight container and stored at ambient conditions, this moisture migration will dissolve the sucrose crystals present in the glaze and progressively dehydrate the donut, resulting in degradation of the foodstuff's soft and moist eating properties.

The application of the present edible coating composition, including a sugar with a lower solubility than sucrose (e.g., isomaltulose) and a gelling agent in a non-gelled state, preserves the softness and moistness of a glazed donut stored in an ambient, airtight container for several days compared to donuts coated with traditional sucrose based glazes. The disclosed edible coating composition reduces or inhibits moisture migration between the donut and coating, preventing the coating from turning into a syrup and dehydrating the donut. Both textural analysis and sensorial evaluation was performed to demonstrate the beneficial effects of isomaltulose based coatings versus traditional sucrose based coatings. Sample preparation and glazing of donuts and storage conditions were as follows.

Freshly fried yeast raised donuts were glazed, cooled down for about 40 minutes and then frozen in a blast freezer. Two types of glazes were then applied to the donuts. A Crystal Glaze, which is a traditional sucrose based glaze, was applied to some donuts. An Edible Coating (EC), which is an isomaltulose based glaze comprising a gelling agent in a non-gelled state.

Frozen glazed donuts were then packed in airtight containers and transferred to a freezer warehouse for about 3 weeks. After 3 weeks, packed donuts were taken out of the freezer warehouse and defrosted in its sealed packaging for different time periods (0, 1, 2 and 4 days defrosted shelf life). On the day of testing, products were available with 4 different defrosted shelf lives (0, 1, 2 and 4 days defrosted shelf life), with Day 0 being defined as a frozen product taken out of a freezer and defrosted for only five hours. Day 1 is 24 hours defrosted, Day 2 is 48 hours defrosted, and Day 4 is 96 hours defrosted.

Defrosted donuts were then subjected to texture analysis by means of compression with a texture analyzer (type TA-XT) using the Texture Profile Analysis (TPA) method. More details regarding the TPA method using the TA-XT may be found at https://texturetechnologies.com/resources/texture-profile-analysis#tpa-measurements. Briefly, a probe of the TA-XT was used to evaluate the force (grams-force) required to compress the sample at ambient temperatures.

Right before the textural analysis of the donuts, defrosted donuts were unpacked, halved by a cutting means or mechanism to expose a cross-section, and subjected to a TPA measurement cycle. The following parameters were assessed via the TPA textural analysis: Firmness (1 and 2), New Cohesiveness, and Elasticity. Firmness 1 is a first measure of force required by the probe to compress the sample. Firmness 2 is a second measure of force required by the probe to compress the sample a second time. The firmness or hardness evaluation measures the texture of each sample.

Figure 4:
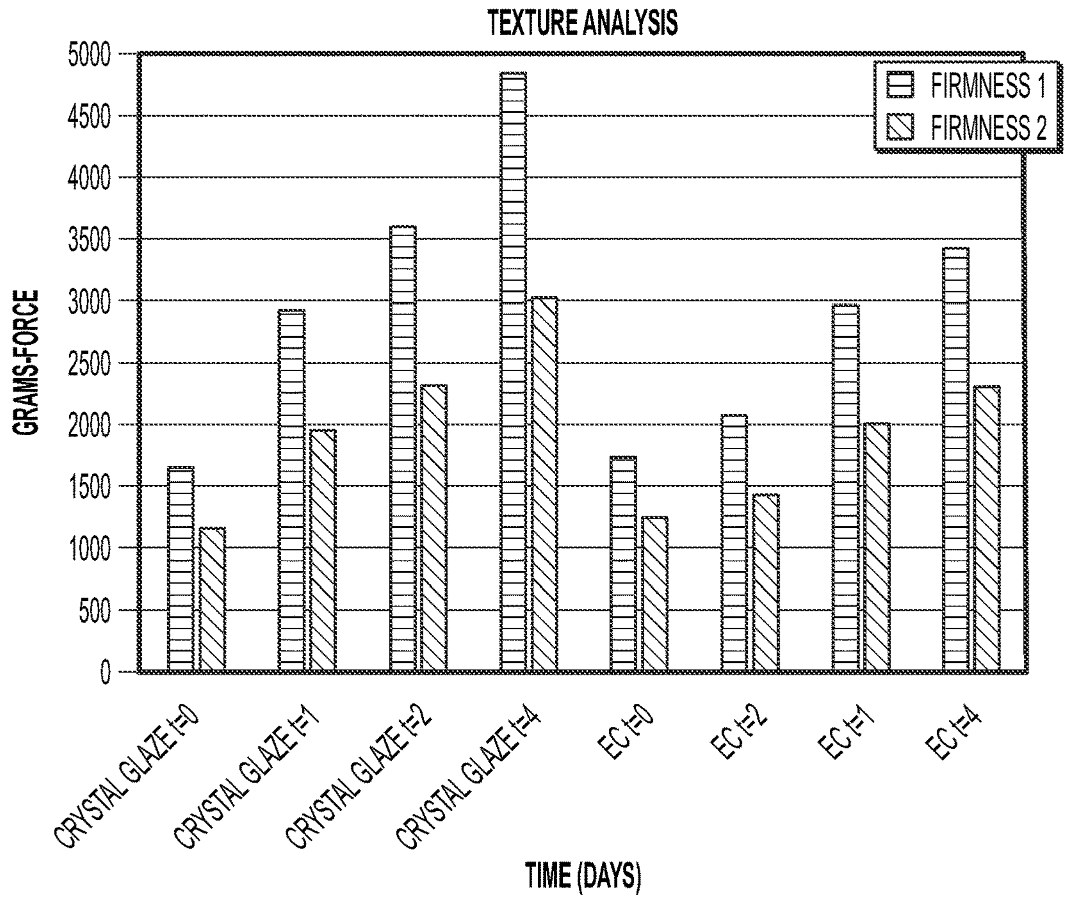
FIG. 4 is a graph comparing a texture profile of a traditional glazed donut (i.e., coated with a sucrose-based crystal glaze) to an embodiment of an edible coating (EC) donut of the present disclosure.

Turning to FIG. 4, while Firmness 1 and 2 are similar for the EC and traditional crystal glaze on Day 0, significant differences are observed on Days 1, 2, and 4. Specifically, the firmness (e.g., Firmness 1 and 2) of the crystal glaze is significantly higher on Days, 1, 2, and 4 than the firmness of the EC coating. While the maximum Firmness 1 of the EC coating does not reach 3500 grams-force on any days, the Firmness 1 of the traditional crystal glaze is over 3500 grams-force on Days 2 and Day 4. Similarly, the maximum Firmness 2 on Day 4 for the EC coating is about the same 2300 grams-force as Firmness 2 of the traditional crystal glaze on Day 2.

The gradual increase in the Firmness 1 of the edible coating composition samples (EC) over the 4 day defrost time period demonstrate that the defrosted donuts coated with the present edible coating composition maintain its reduced firmness, soft eating properties, and smooth mouthfeel for at least about 24 to about 72 hours longer than the traditional crystal glaze donuts. In contrast, the traditional crystal glaze Firmness 1 increased more substantially compared to Firmness 1 of the EC over the 4-day test.

New Cohesiveness and Elasticity are characteristics or attributes of the coated foodstuff related to the resilience of a structure after deformation. These values are calculated using the industry accepted formulas also described in the Texture Profile Analysis (TPA) method. Briefly, Cohesiveness and Elasticity are calculated using the values obtained for Firmness 1 and Firmness 2. Both parameters provide a measurement of crumbliness and staled textures of the coated foodstuff.

Figure 5:
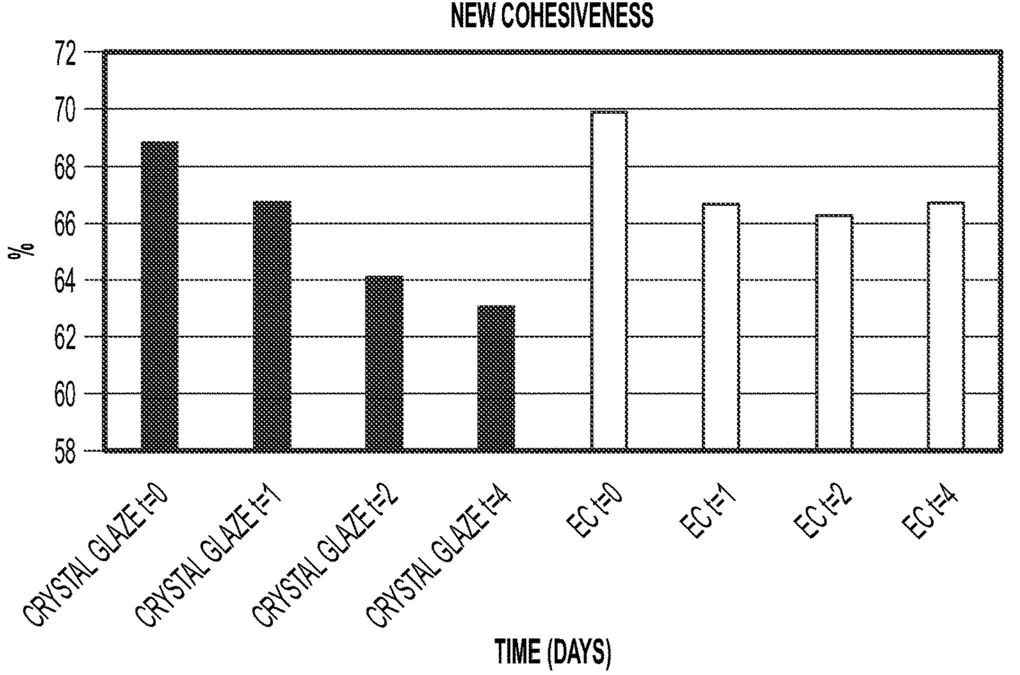
FIG. 5 is a graph comparing the cohesiveness of the traditional glazed donut (i.e., coated with a sucrose-based crystal glaze) to the EC donut of FIG. 4.

FIG. 5 demonstrates that on Days 0, 2, and 4, the EC coated foodstuff had significantly increased cohesiveness than the traditional crystal glazed foodstuff. Notably, however, both the traditional crystal glazed foodstuff and the EC glazed foodstuff had about 66.7% cohesiveness on Day 1. Therefore, the improved cohesiveness of the present edible coating is an improved technical effect that is particularly observed after 24 hours (e.g., from about 26 to about 96 hours). Specifically, Crystal t=2 was about 64.1%, EC t=2 was about 66.3%, Crystal t=4 was about 63.1%, and EC t=4 was about 66.7%.

Figure 6:
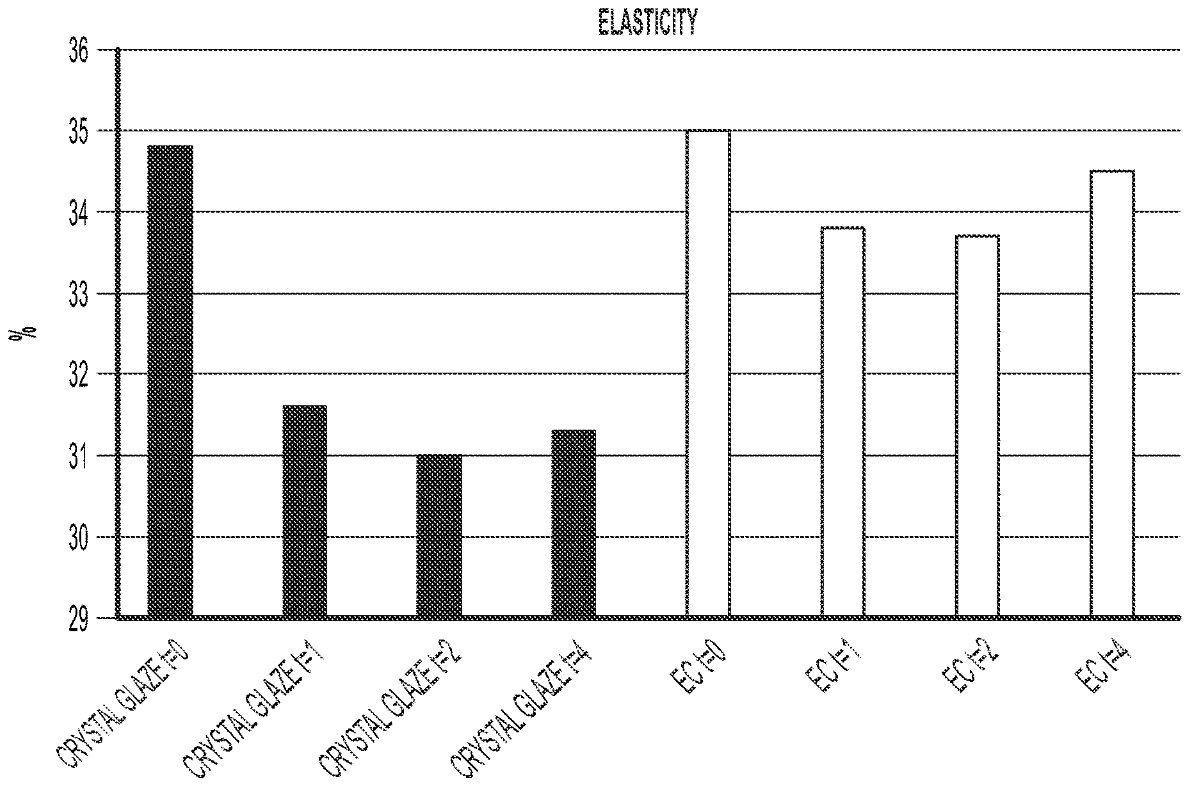
FIG. 6 is a graph comparing the elasticity of the traditional glazed donut (i.e., coated with a sucrose-based crystal glaze) to the EC donut of FIG. 4.

Excluding Day 0, the EC coating showed significant improvement to the elasticity of the coated foodstuff. Notably, the elasticity of the coated foodstuff was increased about 2% from about 31.5% for the traditional crystal glaze over the 4 days, to about or greater than 33.5% over the same time period. Specifically, Crystal t=1 was about 31.6%, Crystal t=2 was about 31%, and Crystal t=4 was about 31.3%. In contrast, EC t=1 was about 33.8%, EC t=2 was about 33.7%, and EC t=4 was about 34.5%. Overall, referring to FIGS. 5 and 6, the gradual change in the bar graphs of the EC data compared to the Crystal Glaze data suggest that it takes longer before the coated donuts comprising the present edible coating to turn crumbly, stale, and lose their elasticity as compared to traditionally glazed donuts. Generally, FIGS. 4-6 demonstrate that donuts glazed with an isomaltulose-based glaze of the present edible coating composition keep softer longer, and have better elasticity and cohesiveness as compared to donuts glazed with traditional sucrose based glazes.

Example 9: the Edible Coating was Similar or Preferred Over the Sucrose Glazed Donut Over Time Samples were prepared as provided in Example 8. After three weeks, packed donuts were taken out of the freezer warehouse and "defrosted in pack" so that on the day of sensory evaluation, products were available with three different defrosted shelf lives (e.g., 1, 2 and 4 days defrosted shelf life). A panel comprising six trained panelists having expertise in the food arts evaluated these donuts.

Each panelist was presented with six different donuts in a randomized and blinded manner. The panel was asked to evaluate defrosted donuts first on tactile properties (by touching), then on eating characteristics (by eating). Just before the start of this assessment, the panel leader designated the Crystal glazed donut with one day defrosted shelf life as The Referent, meaning that panelists had to score each attribute for each donut in relation to this Referent sample.

The scoring was conducted as follows. A score of "0" meant no or negligible difference between the sample and the Referent. A score "+" or "−" meant a moderate positive or negative deviation from the Referent, respectively. A score of "++" or "−−" indicated a strong positive or negative deviation from the Referent, respectively. Finally, the panel was also asked to conclude by designating one donut as the best and one donut as worst of the series. After the assessment, the panelists scores were averaged by the panel leader (i.e., scores were first added up and then divided by 6). The results of this method are summarized in the following Table 6.

As shown in Table 6, the Crystal glaze, which is the traditional sucrose based glaze scored relatively well on the absence of stickiness. It may be that after one (1) day of defrosted shelf life, the glaze had liquefied to such an extent that it had largely been absorbed by the crust of the donut. As a consequence, the traditional crystal glaze was also no longer visible or present atop the donut, and therefore, did not give any sticky touch at all.

After four days of defrosted shelf life, the donut glazed with Crystal glaze scored very moderate to poor on all attributes except for stickiness. It was also evaluated as the "worst of the series" by 5 out of 6 panelists. On the other hand, the donut glazed with EC was judged as the best by 4 panelists after 4 days of defrosted shelf life. In addition, this EC glaze was still clearly visible as a glossy coating on top of the donut after Day 4 of defrosted shelf life.

The qualitative and quantitative data provided in the present Examples show that both the texture analyses and sensory evaluations performed in the present Examples support that the desired textural and sensory properties of coated donuts, whether glazed or iced, can be preserved over longer periods of ambient packed shelf life when glazed with the edible coating composition as compared to traditional crystal sucrose-based coatings.

TABLE 6

Results of Panelist Sensory Evaluation of Coated Foodstuff with Edible Coating Composition versus Traditional Crystal Glaze

| | | 1 day defrosted | | 2 days defrosted<br>blind sample code | | 4 days defrosted | |
|---|---|---|---|---|---|---|---|
| | | REFERENCE Crystal glaze | 417 GT 154 | 821 Crystal glaze | 635 GT 154 | 178 Crystal glaze | 240 GT 154 |
| Tactile | Softness of donut | 0 | 0 | 0 | + | − | 0 |
| | Resilience of donut | 0 | 0 | − | 0 | − | 0 |
| | Stickiness of glaze<br>−−: not sticky/++: very sticky | 0 | −− | 0 | −− | − | −− |
| Eating | Softness of donut | 0 | + | 0 | + | − | + |
| | Moistness of donut | 0 | + | 0 | 0 | − | + |
| | Easy to chew | 0 | + | 0 | + | − | + |
| | evaluated as "Best of Series" | | 2X | | | | 4X |
| | evaluated as "Worst of Series" | | 1X | | | 5X | |

The following numbered embodiments are also contemplated and non-limiting:

1. An edible coating composition with improved stability comprising:
   a crystalline phase comprising a low solubility sugar with a crystal morphology, and a non-crystalline phase comprising a pectin in a non-gelled state.
2. The edible coating composition of clause 1, wherein the low solubility sugar comprises a monosaccharide, disaccharide, or a polyol with lower solubility than sucrose.
3. The edible coating composition of clause 1 or clause 2, wherein the low solubility sugar comprises crystals.
4. The edible coating composition of any of the preceding clauses, wherein the low solubility sugar is isomaltulose.
5. The edible coating composition of any of the preceding clauses, wherein the pectin has a degree of amidation ranging from about 0% to about 14%.
6. The edible coating composition of any of the preceding clauses, wherein the pectin has a degree of methoxylation of less than 25%.
7. The edible coating composition of any of the preceding clauses, wherein the pectin has a degree of methoxylation of less than 50%.
8. The edible coating composition of any of the preceding clauses, wherein the non-crystalline phase further comprises sucrose, a second sugar having a lower solubility than sucrose, glycerin, and water.
9. The edible coating composition of any of the preceding clauses, wherein the second sugar is isomaltulose, maltose, or lactose.
10. The edible coating composition of any of the preceding clauses, wherein the non-crystalline phase comprises a gelling agent in a non-gelled state.
11. The edible coating composition of any of the preceding clauses, wherein the edible coating composition has a pH at or greater than about 3.5.
12. The edible coating composition of any of the preceding clauses, wherein the coating composition application onto a foodstuff is capable of remaining stable in an airtight container for at least 48 hours at ambient conditions.
13. The edible coating composition of any of the preceding clauses, further comprising a sequestering agent.
14. The edible coating composition of any of the preceding clauses, wherein the sequestering agent captures free or ionized Ca2+.
15. The edible coating composition of any of the preceding clauses, wherein the crystalline phase and non-crystalline phase are present in a ratio of about 2:1 to 1:2.
16. The edible coating composition of clause 15, wherein the crystalline phase and non-crystalline phase are present in a ratio of about 1:1.
17. The edible coating composition of any of the preceding clauses, wherein the edible coating composition has a dry matter content that is greater than 55%.
18. The edible coating composition of any of the preceding clauses, wherein the edible coating composition has a dry matter content at or greater than 65%.
19. The edible coating composition of any of the preceding clauses, wherein the dry matter content ranges from about 48% to about 85%.
20. The edible coating composition of any of the preceding clauses, wherein the edible coating composition has a pH ranging from about 3.6 to about 4.5.
21. The edible coating composition of any of the preceding clauses, wherein the free or ionized Ca2+ is below 5 ppm.
22. The edible coating composition of any of the preceding clauses, wherein the pectin has a degree of methoxylation that ranges from about 4% to about 10%.
23. A method of making a coated foodstuff product, comprising: applying an edible coating composition to a foodstuff, and producing a coated foodstuff product, wherein the edible coating composition comprises a crystalline phase and a non-crystalline phase, wherein the crystalline phase comprises a low solubility sugar with a crystal morphology and the non-crystalline phase comprises a pectin in a non-gelled state,
24. The method of clause 23, wherein the step of applying the edible coating composition comprises a glaze curtain.
25. The method of clause 23 or clause 24, wherein the edible coating composition is applied directly onto the foodstuff.
26. The method of any of clauses 23 to 25, wherein there is no intervening material between the foodstuff and the edible coating composition.
27. The method of clauses 23 to 26, wherein the edible coating composition is applied as a layer on the foodstuff.
28. The method of clauses 23 to 27, wherein the thickness of the layer ranges from about 0.2 mm to about 5 mm.
29. The edible coating composition of any of the preceding clauses and the method of any of the preceding clauses, wherein the foodstuff is a bakery good or a fried good.
30. The edible coating composition of any of the preceding clauses and the method of any of the preceding clauses, wherein the foodstuff is a donut.
31. The method of any of the preceding clauses, wherein the donut is a yeast-raised donut.
32. The method of any of the preceding clauses, wherein the donut is a cake donut.
33. The edible coating composition of any of the preceding clauses and the method of any of the preceding clauses, wherein the edible coating has improved stability that prevents or reduces blooming.
34. The edible coating composition of any of the preceding clauses and the method of any of the preceding clauses, wherein the crystalline phase comprises sugar crystals or mineral crystals having an average diameter equal to or less than 100 microns.
35. The method of clause 34, wherein the sugar crystals or mineral crystals have an average diameter of about 100 microns.
36. The method of clause 35, wherein the edible coating has an opacity that appears translucent or transparent.
37. The method of any of the preceding clauses, wherein the sugar crystals or mineral crystals have an average diameter equal to or less than 50 microns.
38. The edible composition of any of the preceding clauses and the method of any of the preceding clauses, wherein the foodstuff has a temperature ranging from about −30° C. to 200° C.
39. The edible composition of any of the preceding clauses and the method of any of the preceding clauses, wherein the edible coating composition remains stable for at least 48 hours in an airtight container at ambient conditions.

40. The method of clauses 34 to 37, wherein the opacity of the edible coating composition is controlled without the addition of a pigment or a coloring.
41. The edible composition of any of the preceding clauses and the method of any of the preceding clauses, wherein the edible coating composition comprises 5 ppm or less of free Ca2+.
42. The edible coating composition of any of the preceding clauses and the method of any of the preceding clauses, wherein the $A_w$ is adjusted to produce a glossy sheen.
43. The edible coating composition of any of the preceding clauses and the method of any of the preceding clauses, wherein the edible coating composition further comprises a flavoring or a pigment.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not. Unless provided otherwise, all mentions of % or % by weight are referring to the % by weight of the edible composition.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" and "and/or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An edible coating composition with improved freezer stability comprising:

a crystalline phase comprising a low solubility sugar with a crystal morphology, wherein the low solubility sugar has a lower solubility lower than sucrose and is selected from the group consisting of isomaltulose, maltose, and lactose, and a non-crystalline phase comprising a pectin in a non-gelled state ranging from about 0.2% to about 2% by weight and about 15% to about 45% by weight of water, wherein the crystalline phase and non-crystalline phase are present in a ratio by weight of about 2:1 to 1:2, and wherein a water activity of the non-crystalline phase is configured to prevent or reduce moisture migration between the edible coating composition and a foodstuff.

2. The edible coating composition of claim 1, wherein the low solubility sugar comprises crystals.

3. The edible coating composition of claim 1, wherein the pectin has a degree of amidation ranging from about 0% to about 14%.

4. The edible coating composition of claim 1, wherein the pectin has a degree of methoxylation of less than 50%.

5. The edible coating composition of claim 1, wherein the non-crystalline phase further comprises glycerin, water, sucrose, and a second sugar having a lower solubility than sucrose.

6. The edible coating composition of claim 1, wherein the crystalline phase and non-crystalline phase are present in a ratio by weight of about 1:1.

7. The edible coating composition of claim 1, wherein the edible coating composition has a dry matter content that is greater than 55%.

8. The edible coating composition of claim 1, wherein the crystalline phase comprises sugar crystals or mineral crystals having an average diameter equal to or less than 100 microns.

9. The edible coating composition of claim 1, wherein reduction of moisture migration between the edible coating composition and the foodstuff is also configured to reduce a syrup generation, reduce a solubilization rate, create a three-dimensional gelled matrix that stabilizes the syrup, or form a glossy sheen on the edible coating composition, as compared to a coating composition wherein the crystalline phase and the non-crystalline phase are present in a ratio by weight outside of about 2:1 to 1:2.

10. The edible coating composition of claim 9, wherein the syrup generation is reduced by about 50% to about 100%.

11. A method of making a coated foodstuff product, comprising:

applying an edible coating composition onto a foodstuff to produce a coated foodstuff product, wherein the edible coating composition comprises a crystalline phase and a non-crystalline phase, wherein the crystalline phase comprises a low solubility sugar with a crystal morphology that has a solubility lower than sucrose and is selected from the group consisting of isomaltulose, maltose, and lactose, and wherein the non-crystalline phase comprises a pectin in a non-gelled state ranging from about 0.2% to about 2% by weight and about 15% to about 45% by weight of water, wherein the crystalline phase and non-crystalline phase are present in a ratio by weight of about 2:1 to 1:2, and wherein a water activity of the non-crystalline phase is configured to prevent or reduce moisture migration between the edible coating composition and the foodstuff.

12. The method of claim 11, wherein the crystalline phase comprises sugar crystals or mineral crystals having an average diameter equal to or less than 100 microns.

13. The method of claim 11, wherein the foodstuff has a temperature ranging from about −30° C. to 200° C.

14. The method of claim 11, wherein the edible coating composition comprises 5 ppm or less of free Ca2+.

15. The method of claim 11 further comprising storing the coated foodstuff product in an air-tight container.

16. The method of claim 11, wherein the pectin has a degree of methoxylation of less than 50%.

17. The method of claim 11, wherein the non-crystalline phase further comprises glycerin, water, sucrose, and a second sugar having a lower solubility than sucrose; and wherein the second sugar is selected from the group consisting of isomaltulose, maltose, and lactose.

18. The method of claim 11, wherein reduction of moisture migration between the edible coating composition and the foodstuff is also configured to reduce a syrup generation, reduce a solubilization rate, create a three-dimensional gelled matrix that stabilizes the syrup, or form a glossy sheen on the edible coating composition, as compared to a coating composition wherein the crystalline phase and the non-crystalline phase are present in a ratio by weight outside of about 2:1 to 1:2.

19. The method of claim 18, wherein the syrup generation is reduced by about 50% to about 100%.

20. The method of claim 11, wherein the pectin has a degree of amidation ranging from about 0% to about 14%.

* * * * *